US007860736B2

(12) United States Patent
Draper et al.

(10) Patent No.: US 7,860,736 B2
(45) Date of Patent: Dec. 28, 2010

(54) COURSE CONTENT DEVELOPMENT METHOD AND COMPUTER READABLE MEDIUM FOR BUSINESS DRIVEN LEARNING SOLUTIONS

(75) Inventors: William Christopher Draper, New York, NY (US); John R. Hubbell, Evanston, IL (US); Christopher P. Foley, Chicago, IL (US); Thomas Kenneth Stoval, Marietta, GA (US)

(73) Assignee: Accenture Global Services GmbH, Schaffhausen (CH)

( * ) Notice: Subject to any disclaimer, the term of this patent is extended or adjusted under 35 U.S.C. 154(b) by 1811 days.

(21) Appl. No.: 10/401,045

(22) Filed: Mar. 28, 2003

(65) Prior Publication Data
US 2004/0002039 A1    Jan. 1, 2004

Related U.S. Application Data

(60) Provisional application No. 60/391,929, filed on Jun. 28, 2002, provisional application No. 60/391,932, filed on Jun. 28, 2002, provisional application No. 60/398,926, filed on Jul. 29, 2002.

(51) Int. Cl.
    *G06Q 10/00*    (2006.01)
(52) U.S. Cl. ........................... 705/7; 434/118; 434/219; 434/322; 434/350
(58) Field of Classification Search ...................... 705/7
    See application file for complete search history.

(56) References Cited

U.S. PATENT DOCUMENTS 4,764,120 A     8/1988    Griffin et al. ................ 434/336

| 5,261,823 A | 11/1993 | Kurokawa ................... 434/323 |
| 5,303,042 A | 4/1994 | Lewis et al. .............. 348/14.01 |
| 5,625,818 A | 4/1997 | Zarmer et al. ............ 707/104.1 |

(Continued)

FOREIGN PATENT DOCUMENTS

WO    WO 9803953 A2    1/1998

OTHER PUBLICATIONS

Doyle and Carolan, Calling All Trainers, Training & Development, Jan. 1998, p. 58-67.*

(Continued)

*Primary Examiner*—Beth V Boswell
*Assistant Examiner*—Justin M Pats
(74) *Attorney, Agent, or Firm*—Finnegan Henderson Farabow Garrett & Dunner LLP

(57) ABSTRACT

Disclosed herein are learning solutions that utilize a content development module that is nested inside a total learning solution and identifies, develops, and manages required course content. A content development module is particularly adapted to assemble and compile custom learning content materials for use in the learning solution by appropriately taking business strategy alignment and other information into consideration. The learning content may be developed as a third party service in accordance with a service level agreement. A service level agreement is a contract between the learning solution services provider and the learner (i.e., outsourcing) organization that establishes the requisite quality and effectiveness levels of the learning solution services as measured by one or more performance metrics. In such cases where a service level agreement is present, internal performance metrics are constantly evaluated to ensure that the content development and management resources necessary for a given learning effort are properly reserved, allocated, and/or utilized.

23 Claims, 12 Drawing Sheets

U.S. PATENT DOCUMENTS

| | | | |
|---|---|---|---|
| 5,788,504 A * | 8/1998 | Rice et al. | 434/219 |
| 5,851,117 A | 12/1998 | Alsheimer et al. | 434/219 |
| 5,987,443 A | 11/1999 | Nichols et al. | 706/11 |
| 6,067,525 A | 5/2000 | Johnson et al. | 705/10 |
| 6,067,537 A * | 5/2000 | O'Connor et al. | 706/47 |
| 6,099,320 A | 8/2000 | Papadopoulos | 434/322 |
| 6,149,438 A | 11/2000 | Richard et al. | 434/322 |
| 6,149,441 A | 11/2000 | Pellegrino et al. | 434/350 |
| 6,157,808 A | 12/2000 | Hollingsworth | 434/350 |
| 6,161,113 A * | 12/2000 | Mora et al. | 715/234 |
| 6,301,462 B1 | 10/2001 | Freeman et al. | 434/350 |
| 6,315,572 B1 | 11/2001 | Owens et al. | 434/322 |
| 6,347,333 B2 | 2/2002 | Eisendrath et al. | 709/217 |
| 6,409,514 B1 | 6/2002 | Bull | 434/219 |
| 6,551,107 B1 | 4/2003 | Buckley et al. | 434/262 |
| 6,608,992 B2 | 8/2003 | Crook et al. | 434/350 |
| 6,652,287 B1 | 11/2003 | Strub et al. | 434/365 |
| 6,658,427 B2 | 12/2003 | Kogut-O'Connell et al. | 707/103 Y |
| 6,755,659 B2 | 6/2004 | LoSasso et al. | 434/219 |
| 6,793,498 B1 | 9/2004 | Nunes | 434/322 |
| 6,827,578 B2 | 12/2004 | Krebs et al. | 434/118 |
| 6,892,049 B2 | 5/2005 | Phalp et al. | 434/350 |
| 6,898,411 B2 | 5/2005 | Ziv-el et al. | 434/350 |
| 6,944,624 B2 | 9/2005 | Orton et al. | 707/102 |
| 6,978,115 B2 * | 12/2005 | Whitehurst et al. | 434/350 |
| 6,988,138 B1 | 1/2006 | Alcorn et al. | 709/225 |
| 7,031,651 B2 | 4/2006 | McCormick et al. | 434/350 |
| 7,051,036 B2 * | 5/2006 | Rosnow et al. | 707/102 |
| 7,156,665 B1 | 1/2007 | O'Connor et al. | 434/323 |
| 7,269,569 B2 * | 9/2007 | Spira et al. | 705/7 |
| 2001/0031451 A1 | 10/2001 | Sander et al. | 434/236 |
| 2001/0055749 A1 | 12/2001 | Siefert | 434/322 |
| 2002/0061506 A1 | 5/2002 | Catten et al. | 434/369 |
| 2002/0064766 A1 | 5/2002 | Cozens et al. | 434/350 |
| 2002/0077884 A1* | 6/2002 | Sketch | 705/12 |
| 2002/0082833 A1 | 6/2002 | Marasek et al. | 704/251 |
| 2002/0082883 A1 | 6/2002 | Hankinson | 705/7 |
| 2002/0103882 A1 | 8/2002 | Johnston et al. | 709/218 |
| 2002/0142278 A1 | 10/2002 | Whitehurst et al. | 434/350 |
| 2002/0156702 A1 | 10/2002 | Kane | 705/27 |
| 2002/0173999 A1 | 11/2002 | Griffor et al. | 705/7 |
| 2002/0178181 A1 | 11/2002 | Subramanyan et al. | 707/501.1 |
| 2002/0188583 A1 | 12/2002 | Rukavina et al. | 706/45 |
| 2002/0194195 A1 | 12/2002 | Fenton et al. | 707/104.1 |
| 2003/0004766 A1 | 1/2003 | Sandoval et al. | 705/7 |
| 2003/0009742 A1 | 1/2003 | Bass et al. | 717/104 |
| 2003/0023641 A1 | 1/2003 | Gorman et al. | 707/530 |
| 2003/0046125 A1* | 3/2003 | Flores | 705/7 |
| 2003/0050814 A1 | 3/2003 | Stoneking et al. | 705/7 |
| 2003/0101066 A1 | 5/2003 | Jeanblanc et al. | 705/1 |
| 2003/0113697 A1* | 6/2003 | Plescia | 434/322 |
| 2003/0229529 A1 | 12/2003 | Mui et al. | 705/8 |
| 2004/0002040 A1 | 1/2004 | Foley et al. | |
| 2004/0009462 A1 | 1/2004 | McElwrath | 434/350 |
| 2004/0133437 A1 | 7/2004 | Draper, Jr. | |
| 2004/0162901 A1 | 8/2004 | Mangipudi et al. | 709/225 |
| 2005/0192954 A1 | 9/2005 | Gupta et al. | 707/4 |
| 2007/0026374 A1 | 2/2007 | Sanregret et al. | 434/350 |
| 2007/0061183 A1 | 3/2007 | Seetharaman et al. | 705/9 |

OTHER PUBLICATIONS

Teare and Dealtry, Building and sustaining a learning organization, The Learning Organization, vol. 5, No. 1, 1998, p. 47 et seq.*

Getting Results Through Learning, OPM.gov, archived from Jun. 1, 2001, available at http://govinfo.library.unt.edu/npr/library/book/contents.htm.*

Berry, The E-Learning Factor, InternetWeek.com, Nov. 1, 2000.*

Pope, Form a Successful Strategy: Align your e-learning plans with corporate objectives. LTI Magazine, Feb. 1, 2002 pp. 1-6.

Henry E-learning technology content and services, Education & Training, vol. 43, No. 4/5, 2001, pp. 249-255.

Lin et al., Fast Learning: Aligning Learning and Development with Business Strategies, Employment Relations Today, Autumn 2001, vol. 28, Issue 3, pp. 43-57.

Kirkpatrick, D.L. (1998). Evaluating Training Programs: The Four Levels. San Francisco, CA: Berrett Koehler, pp. 1-3.

Long, Doug; "Make Sales Training Web-Easy." Oct. 2001, Industrial Distribution. vol. 90, Issue 10.

McMaster, Mark. "Training Places." Oct. 2001. Sales and Marketing Management. vol. 153, Issue 10.

Dobbs, Kevin. "Training on the Fly." Nov. 2000. Sales and Marketing Management. vol. 152, Issue 11.

Rumusson, Erika. "Training Goes Virtual." Sep. 2000. Sales and Marketing Management. vol. 152, Issue 9.

Pease, Paul. "Personal Field Sales Training Via the Internet." Feb. 2000. Agency Sales. vol. 30, Issue 2.

Berger, Melanie. "On-the-job Training." Feb. 1998. Sales and Marketing Management. vol. 150, Issue 2.

Lejfer, Sidney C. "The Importance of Training in Sales Force Automation." Dec. 1998. Supervision. vol. 58, Issue 12.

Pinkham, Myra. "Tomorrow's Sales People are Today's Trainees." Jul. 1997. Metal Center News. vol. 37, Issue 8.

Kahn, Robert M. "$21^{st}$ Century Training." Jun. 1997. Sales and Marketing Management. vol. 149, Issue 6.

"CompUSA Inks With CCS for Training" Mar. 22, 1999. TWICE. vol. 14, Issue 7.

Doyle, John C.; Carolan, Mary D. "Calling All Trainers" Jan. 1998. Training and Development. pp. 58-67.

Teare, Richard; Dealtry, Richard. "Building and Sustaining a Learning Organization." 1998. The Learning Organization. vol. 5, Issue 1.

Tambini, Robert F. "Aligning Learning Activities and Assessment Strategies in the ESL Classroom." Sep. 1999. The Internet TESL Journal. vol. 5, Issue 9.

"Getting Better Results." UNT Libraries. Archived Jan. 7, 2002. retrieved from http://govinfo.library.unt.edu/npr/library/book/Better-Results.htm.

Lewis, Jason; Michaluk, Dan. "Four Steps to Building E-learning Success." May 2002. Workforce. vol. 81, Issue 5. pp. 42, 44 and 46.

Debora Mateik, The summer institute for instructional technology: goodbye chalk and slate; hello mouse and web, 1995, ACM Press, ISBN:0-89791-704-9, pp. 201-205.

Carol B. MacKnight, Electronic learning materials: the crisis continues, (Apr. 1998), ACM Press, vol. 26: Issue 2, pp. 8-16.

David Carlson et al. www interactive learning environment for computer science education, 1996, ACM Press, ISBN:0-89791-757-X, pp. 290-294.

Holland, Patricia E. Professional Development in Technology: Catalyst for School Reform. Jun. 22, 2001. Gale Group. Association for the Advancement of Computing in Education (AACE). Journal of Technology and Teacher Education. vol. 9. ISSN: 1059-7069. IAC-ACC-No. 78398475. p. 5.

Berry, John. "The E-Learning Factor." Nov. 6, 2000, InternetWeek. retrieved from http://www.internetweek.com/indepth/indepth110600.htm.

* cited by examiner

COURSE CONTENT DEVELOPMENT METHOD AND COMPUTER READABLE MEDIUM FOR BUSINESS DRIVEN LEARNING SOLUTIONS

CROSS-REFERENCE TO RELATED APPLICATIONS

This application claims benefit of the filing dates of U.S. provisional patent application Ser. No. 60/391,929, filed Jun. 28, 2002, U.S. provisional patent application Ser. No. 60/391,932, also filed Jun. 28, 2002, and U.S. provisional patent application Ser. No. 60/398,926, filed Jul. 29, 2002. U.S. non-provisional patent application Ser. No. 10/265,156, filed Oct. 7, 2002, the disclosure of which is herein incorporated by reference in its entirety, shares subject matter in common with the present invention.

FIELD OF THE INVENTION

The present invention relates to a course content development modules and related platforms for managing the learning and training needs of an enterprise in an effective manner that is responsive to dynamic business needs. More particularly, the present invention relates to learning solutions that utilize a content development module that is nested inside a total learning solution and that identifies, develops, and manages required course content.

BACKGROUND OF THE INVENTION

Employee training and education is becoming increasingly critical to the success of organizations within today's modern global economy. As a minimum requirement to remaining competitive, companies that operate in today's complex industries need employees who remain knowledgeable and current in areas of expertise, enabling their employees to serve the companies' evolving strategic objectives. Executives of such companies, therefore, have a need for improved learning solutions as their various business imperatives bring to the forefront of their strategic objectives a demand for qualified employees.

The increasing complexity of operating modern corporations, however, has increased the difficulty of training corporate employees effectively and efficiently. As corporate business imperatives become more diverse, the demand for diverse course offerings increases. The demand for subject matter experts ("SME") who possess the diverse skill sets necessary to train corporate employees in a multitude of knowledge areas also increases accordingly.

Unfortunately, corporations need a workforce that is well educated in areas concerned with both the technical aspects and the overall business imperatives of the corporation. There is therefore a need for learning solutions that facilitate the development of courses that are aligned with corporate business imperatives, while providing corporate employees with the technical expertise needed to run the corporation.

Sales forces in particular must be effectively trained regarding new product features and value propositions before the best sales results can be obtained. Similarly, new positioning of existing products (e.g., pitching groups of products together as providing improved solutions to clients) requires sales forces to understand not just products individually, but their interplay in forming solutions for target clients in order to effectively implement the strategic business objective. The longer such training takes, the more the implementation of strategic business objectives is delayed.

To reduce corporate training costs, course developers must design course curricula such that information is presented to the students in a manner that maximizes student retention rates and increases employee efficiency. To ensure that student retention rates are maximized, performance-gauging metrics should be pre-defined and tests administered to ensure that the execution of a specific course adequately satisfies the pre-defined metrics. These tests may be performed on students before and after course completion and may be used as feedback for course redesign and subsequent course implementations.

Thus, with proper learning solution systems, the efficiency of employee training may be maximized, thus minimizing costs, by implementing a system of integration and controls to ensure that corporate training is strategically aligned with corporate business objectives. In this manner, modern corporations may remain competitive by maximizing the internal rate of return of their important learning centers. This, in turn, directly impacts the performance of traditional profit centers.

The learning capabilities of a corporation must also be able to support organizational growth and expansion. Without such effective learning systems, leaders of companies may be forced to forgo undertaking bold, yet lucrative, business growth plans because bold growth plans require that a company have the ability to rapidly attract, train, and/or deploy a skilled workforce. Thus, a need exists for a system that improves learning capabilities by integrating existing course competencies with those presented by organizational growth and expansion, thereby accelerating the training speed and speed to competency of an entire corporate workforce.

For example, corporate mergers and reorganizations are commonplace occurrences in many of today's markets and industries. Such mergers and reorganizations often necessitate massive post-merger/reorganization integration efforts by the remaining companies. This not only requires reconciling pre-existing business goals and strategies, but also requires integrating and upgrading educational and training efforts within the corporate entities the remain after the mergers. Improved learning solutions that develop coordinated training courses should be capable of handling such occurrences by easily modifying existing training efforts to match the changing business environment.

Similarly, corporate executives may have business imperatives requiring the initiation of a culture change within the company, the implementation of which will ultimately enable a pre-existing workforce to more easily adapt to the company's changing business focus. An effective integrated learning solution must, therefore, be capable of serving as a tool to drive culture change within an organization. Common culture change themes that require significant learning efforts include quality control changes, initiatives to increase shareholder value, and steps for adopting a customer-centric business focus.

Education within modern companies, however, remains problematic for various reasons. One major complicating factor is the nature of many modern corporations. Often, they are diverse entities that operate globally across international boundaries and in different competitive markets and business areas. Organizations or groups within such modern companies that are charged with learning course or content development and management of learning services are often poorly equipped (either in terms of personnel allocation, organization of the learning assets, infrastructure, or otherwise) to serve all the learning needs of those companies. As such, learning service organizations or groups are often plagued with outdated course content and/or inefficient management services that fail to utilize current technologies to dynamically develop and deliver meaningful courses and related necessary course materials.

Computers have been increasingly employed to address many of the logistical issues associated with the development of learning content for courses that may be taught at multiple times, to large numbers of students who are remotely located, and/or to a student body that has conflicting schedules of availability. For example, computer-delivered instruction systems are available wherein students can receive instruction via a computer over a network by accessing a central repository of previously prepared electronic learning ("e-learning") content courses and/or materials stored on a remote server. The increasing use of computers therefore presents logistical challenges that must be considered in course content development for modern learning systems.

Thus, there is a need for a learning solution that integrates course content development modules that reflect the identification and prioritization of learning needs and enable the efficient design and development of learning content and delivery of that learning content so as to maximize student retention rates. Further, such a learning solution should remain business driven such that course content always remains strategically aligned with corporate business objectives. Contemporary learning solutions currently employed in the business world have failed to integrate content development functions with the overall learning solution to achieve these ends.

There therefore remains a need in the art for an improved business driven learning solution that integrates course content development so as to overcome the above-described issues and other problems associated with current learning solutions. Such a solution preferably utilizes a learning system wherein the course content development operations are seamlessly integrated with the overall learning solution and which produces course content that remains aligned with corporate strategies and objectives. The aforementioned learning solution should provide the ability to design course materials that maximize return on investment and are responsive to client objectives.

SUMMARY OF THE INVENTION

In light of the above-described and other deficiencies inherent in contemporary learning solutions, it is an object of the present invention to provide a business driven learning solution including course content development modules that ensure that instructional content and the delivery mechanisms associated with that content are aligned with the business and learning objectives of the client. Such learning solutions are capable of dramatically improving an organization's efficiency by identifying, prioritizing, and developing employee instructional courses that maximize the effectiveness of critical employee training efforts.

Further, it is an object of the present invention to provide a business driven learning solution including course content development modules that design and develop course materials by identifying and implementing the most suitable mechanisms for efficiently delivering course content to students, including instructor led training, virtual classroom training, computer delivered instruction, printed reading materials, and appropriate combinations thereof.

Additionally, it is an object of the present invention to provide a business driven learning solution including course content development modules that utilize electronic communication and management tools for permanently interlocking learning efforts with business goals and strategies. Such processes and tools enable course instructional content to be easily modified and updated by learning solution administrators, learning effort and/or course administrators, or instructors in response to changing business strategies and priorities.

Also, it is an object of the present invention to provide a business driven learning solution including course content development modules that utilize performance metrics in a manner that facilitates internal process improvement and simplifies cost accounting and allocations for requested development efforts.

Furthermore, it is an object of the present invention to provide a course content development processes for implementation within a business driven learning solution for the design and development of course materials that may be readily managed and delivered by a network of learning systems that comply with relevant e-learning standards. In this manner, the learning systems may be made accessible over any computer network, including the Internet, through an open architecture that enables a business to integrate such learning solution systems with its existing network's applications and infrastructure.

To achieve these and other objects, the disclosed course content development solution and related methods according to the present invention address the learning and training needs of an organization in a manner that is highly responsive to dynamic business needs. Among other things, the course content development solutions disclosed are responsive to corporate timelines, goals and strategic objectives so as to enable an organization to have its learning needs managed effectively in a manner similar to the management of a traditional client services business.

Content development modules and their related processes according to the present invention may be readily integrated and implemented as part of an overall learning solution. Such an overall learning solution may typically comprise other modules, containing interrelated and interdependent learning solution processes, that are in communication and cooperation with a content development module. The content development module is adapted to interact with other modules to provide the development of learning content and selection of related approaches for learning instruction in a manner that is responsive to the identified and requested learning needs of a learner organization. The interaction amongst and between the business processes modules helps to define the services and application capabilities, among other things, required to support an optimized outsourced solution to meet a given organization's business learning objectives.

According to the present invention, a content management module provides an overall learning solution with the capability to internally develop, or alternatively license from external sources, the learning content necessary to implement the learning efforts identified and prioritized by business strategy alignment processes in light of logistical concerns.

Content management modules according to embodiments of the invention can also tag and catalog learning content, such as in the form of a database of reusable, sharable content objects ("SCOs"), which divide the learning content into distinct course chapters and modules such that the SCOs may be reused in future learning efforts as appropriate and also so that they may be easily accessed for delivery to the learner as required. Furthermore, the catalogued learning content SCOs may then be readily accessed by any of the cooperating process modules to facilitate course revisions as well as future course development efforts.

The modules operating in conjunction with the content delivery module in embodiments of the business driven learning solutions include, but are not limited to, a business strategy alignment module to accept business strategy input from the learner organization, prioritize learning requests/needs and assist in developing and delivering appropriate learning efforts by communicating relevant information to processes in the various other modules of the learning solution.

In preferred embodiments of the present invention the learning content is developed as a third party service in accordance with a service level agreement. A service level agreement is a contract between the learning solution services provider and the learner (i.e., outsourcing) organization that establishes the requisite quality and effectiveness levels of the learning solution services as measured by one or more performance metrics. The terms of a service level agreement may require, for example, minimum metrics values relating to minimum increases in student enrollment, employee productivity, or gross sales, as compared with the levels measured before the implementation of a given learning effort.

In another related preferred embodiment of the present invention, internal performance metrics are constantly evaluated to ensure that the content development and management resources necessary for a given learning effort are properly reserved, allocated, and/or utilized. In particular, a development ratio can be employed wherein estimates of the costs and resources needed to develop a particular course (or portions or elements thereof) are made and compared with the actual costs incurred and resources used. Various sub-ratios reflecting effort and time expenditures measured at various phase gates (such as nightly or weekly) thereby allow content developers to better forecast future development costs based by consistently revising predictions of expected production and consumption rates. In this manner, long-term flat rate service fee schedules can be maintained feasibly for a particular service level agreement.

The invention having been thus described, preferred embodiments thereof will now be described in detail with reference to several figures.

DETAILED DESCRIPTION OF THE PREFERRED EMBODIMENTS

As used hereafter, the term "organization" is used broadly to identify the business entity that is in need of a solution to provide learning services. The learning solutions according to the present invention can either be outsourced by such organizations (whereby the processes of the learning solution are implemented by a third party learning services provider under contract to an organization) or can be implemented internally within the organization (as, for example, an independent business unit within the "outsourcing" organization).

The present invention facilitates the identification, development, and management of required course content by actively integrating business goals, directives and priorities into various stages of the processes and mechanisms utilized in producing and maintaining such content. As conceptually depicted in the schematic diagram of FIG. 1, preferred embodiments of the present invention utilize a content management module 120 within the larger framework of an overall learning solution 100 to provide this integration. Such a learning solution 100 comprises modules of interrelated and interdependent business processes, which may be automated by electronic tools provided by various communication platforms as will be described in more detail below. These processes manage and coordinate the learning solution tasks of the prioritization of business learning needs and selection of learning effort approaches, the development of learning content, the delivery of learning content and instruction, the management of learning solution curricula, and the administration of learning solution performance. The interaction of the various modules of business processes with one another helps to define the services, performance metrics and application capabilities, among other things, required to support an optimized outsourceable learning solution to meet a given organization's business learning objectives.

Figure 1:
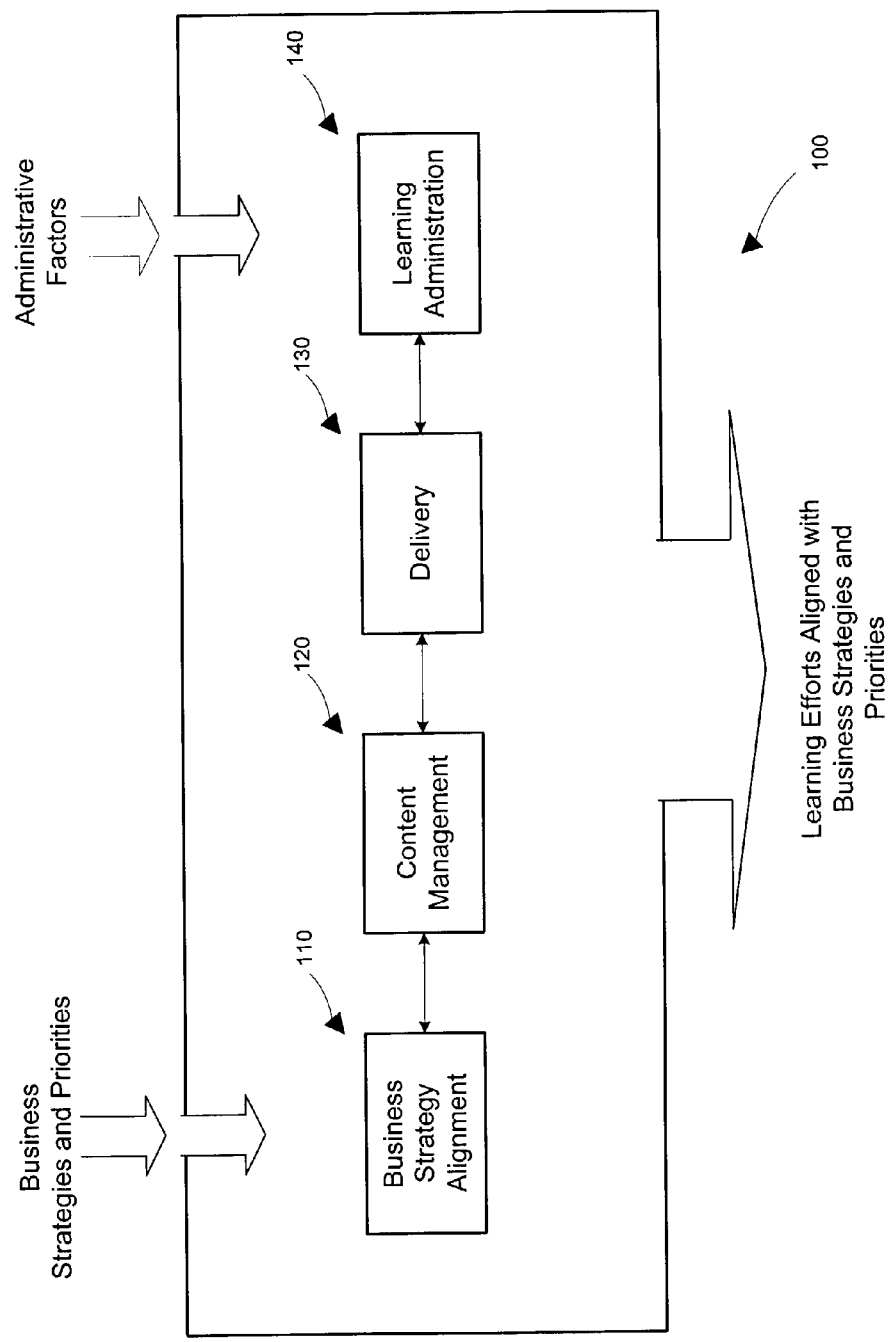
FIG. 1 is a block diagram of the content management module in accordance with an embodiment of the invention.

While the underlying processes and interdependent information flows utilized by such a content management module in identifying, developing, and managing required course content according to preferred embodiments of the present invention are described in detail below with respect to FIGS. 3-9, FIGS. 1-2b will first be discussed to provide an understanding of the larger framework of an overall learning solution 100 within such a content module will operate. One preferred embodiment of such a learning solution is explained in further detail in co-owned and co-pending U.S. non-provisional patent application Ser. No. 10/265,156, filed Oct. 7, 2002. As depicted in FIG. 1 herein, learning solution 100 comprises various modules which interact with a content management module 120 to provide various learning services to an organization. One of the other modules in this embodiment comprises business strategy alignment module 110 that includes processes that identify business strategies of the organization and accept requests for learning efforts (e.g., employee training in a particular product line) from the organization (and/or its business units). It then aligns the organization's overall learning solution goals and requested learning efforts with the organization's current strategy, business objectives and organizational structure. The processes comprising the business strategy alignment module 110 thereafter identify potential learning efforts to meet the objectives of the organization, and support the downstream customized development and subsequent delivery of a tailored learning curriculum by funneling relevant information into processes in the course management module 120 and the various other modules (130 and 140) that comprise solution 100. This alignment ensures that learning curricula is designed to meet the organization's most current and highest priority needs.

Once solution 100 identifies what types of learning or curriculum are desired and/or required by the organization and prioritizes them, the solution is also able to accumulate, certify and compile suitable learning materials for delivery to fill those needs. Content management module 120 includes processes and associated tools required to build and/or buy appropriate learning content and adapt it to an appropriate delivery mechanism based upon learning objectives and delivery requirements. As will be readily appreciated by one of ordinary skill in the art, it may be easier and cheaper at times to buy precompiled learning content from a third party as opposed to developing or compiling new content. Oftentimes, however, the specialized needs of the organization may make it difficult to utilize outsourced or precompiled learning or training content. According to the present invention, content management modules 120 are particularly adapted to assemble and compile custom learning content materials for use in the learning solution by appropriately taking business strategy alignment and other information into consideration. In preferred embodiments of the present invention, the content management module 120 achieves this by building course content materials according learning effort plans as described in detail below.

As such, the content management module 120 of learning solution 100 includes a content development module of the present invention to facilitate the development of critical learning information to ensure that the information is aligned with the needs and objectives of a specific learner organization. Additionally, the content development module 120 is adapted to consider the most efficient ways to present critical learning information (in the example of FIG. 1, presentation is ultimately done later by the delivery module 130 of solution 100) in a manner that is logical, intuitive, and enhances student receptivity and retention.

After learning content has either been obtained from a third party or developed internally by the learning solution, the business processes of content development module also create, manage and operate a central repository of learning content and knowledge objects. The learning content and knowledge objects are appropriately formatted, tagged and cataloged such that they can be reused as appropriate and may be easily accessed for delivery to the learner in the desired manner when scheduled or requested.

Delivery module 130 in turn contains business processes and related tools for providing the delivery of high quality training across a plurality of synchronous and asynchronous media in a cost efficient manner. The delivery business processes in module 130 facilitate, for example, instructor led training, virtual instructor led training (such as with a live instructor connected to students through videoconferencing or over a computer network like the Internet) including virtual classrooms, and interactive computer software-delivered training systems for self-paced learning. Further, the delivery business processes in module 130 assist in coordinating the scheduling of the facilities where training takes place with appropriate instructor and learner commitments.

Still referring to FIG. 1, learning administration module 140 contains business processes and associated tools necessary to provide learning management and administrative services across the entire learning solution 100. Exemplary learning administration business processes include individual curriculum management, course registration, course fulfillment management, record keeping of training results, and related financial settlement information (such as where metrics are used by the organization to gauge the performance or output levels of the solution 100 as described in detail below). Learning administration module 140 also can provide the learning solution 100 with the capability to manage the overall lifecycle of a learning initiative and to provide continuous improvement to currently ongoing and future learning initiatives.

The processes of the business strategy alignment module 110 ensure that the learning efforts provided by the learning solution entities, and, in particular, the customized course content materials designed, produced and developed by the content management and development modules, are completely aligned with the strategic objectives of the organization. The business strategy alignment module 110 passes the requests from the organization (or business units thereof) for new learning efforts or for modified learning efforts through a formal process whereby the requested learning effort becomes cast in a consistent direction with organizational strategic objectives and priorities, funded from appropriate budget allocations, and transformed into a work in progress by the learning solution 100.

Specifically, the business strategy alignment module 110 prepares a learning effort plan or proposal (both hereinafter being referred to interchangeably by the acronym "LEP") that in turn is used to develop a high-level course development plan and a detailed work plan, both of which are described below. The business strategy alignment module 110 uses the LEP to forecast resource demand by using the current aggregate number of LEPs to estimate the number of new service work orders expected in a given fiscal time frame. Finally, the business strategy alignment module 110 delivers the LEP to the course content module 120 to facilitate resource planning and course development.

Figure 2A:
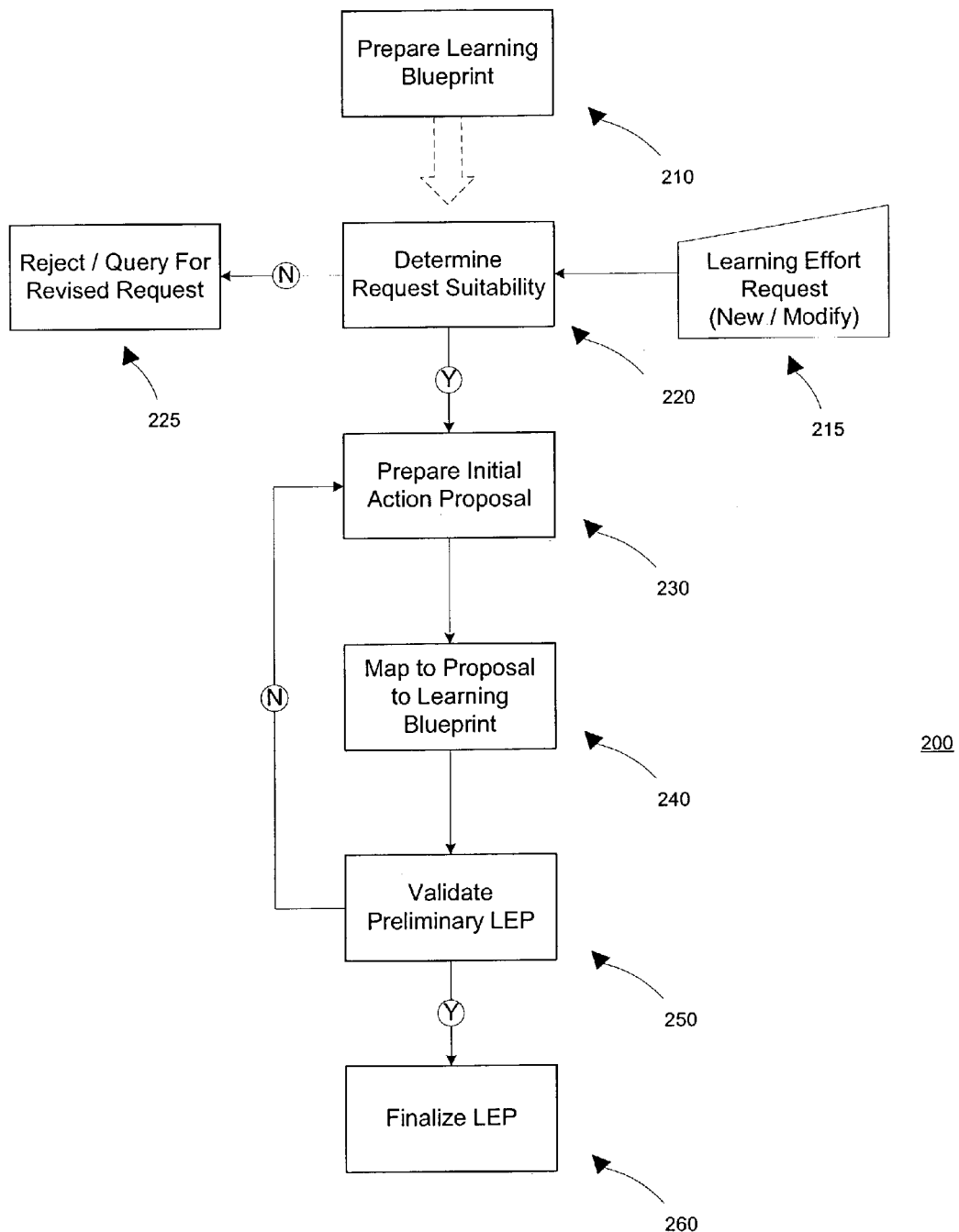
FIG. 2a is a command flow diagram illustrating the business strategy alignment process in accordance with an embodiment of the invention.

Referring now to FIG. 2a, a business strategy alignment process 200 utilized in preferred embodiments of the present invention is depicted and comprises various steps that enable newly requested and ongoing learning efforts to be aligned with prioritized business strategies and goals.

As depicted in FIG. 2a, a business strategy alignment process 200 first prepares 210 a customized learning blueprint for the organization. A learning blueprint provides a grouping and organization of various business strategies and goals across the entire organization and identifies potential areas of learning. Each organization's learning blueprint is therefore unique and is used by the business strategy alignment process 200, and therefore module 110, to determine which potential learning efforts (from the many requested by various entities within the organization) introductions or modifications are funded (from which budget allocation to what amount) and pursued (i.e., if the requested learning effort consistent with one or more stated learning strategies or objectives reflected in the blueprint) and exactly how the request is fulfilled (i.e., requested learning efforts that map to higher organizational priorities may be entitled to different funding or resources).

An organization's learning blueprint is typically reviewed and revised periodically by the business strategy module 110 for the organization, such as once or twice a fiscal year to reflect changing business strategies and learning services budgets. Of course, an organization's learning blueprint can be reviewed and revised at any time whenever significant changes in the learning focus and business strategies or priorities of the learner organization occur.

Figure 2B:
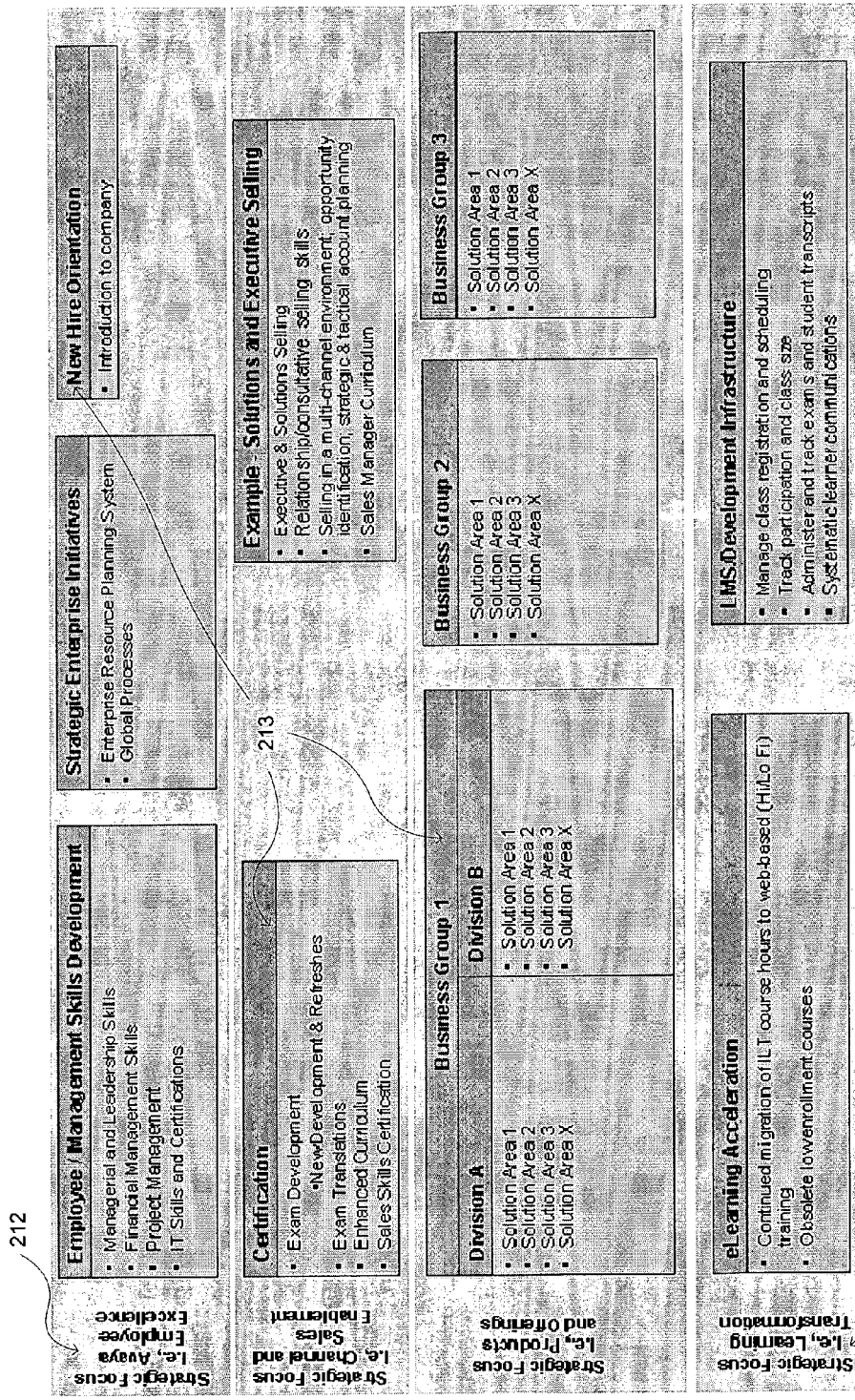
FIG. 2b is a diagram depicting an exemplary learning blueprint that could be utilized in preferred embodiments of the invention to prioritize and fund learning efforts plans design and production according to embodiments of the invention.

FIG. 2b depicts an exemplary learning blueprint 211 that could be utilized to prioritize and allocate funding to learning efforts implemented by learning solutions of the invention for a particular hypothetical organization that is outsourcing its learning needs. As shown in FIG. 2b, a learning blueprint 211 itemizes different strategic objectives of the organization into various tracts 212 which can represent, for example, organizational areas of focus, product groups, business units, or departments within the organization. For a given organization, as depicted in learning blueprint 211, a tract 212 can be assigned, for example, for product segments, sales skills, general employee development and organization culture transformation. For each such tract 212, the learning blueprint itemizes initiatives 213 that reflect particular areas in which the organization expects to focus a significant portion of its attention and expenditures on learning efforts. Thus, an employee development tract can contain separate initiatives for new employee orientation, and training regarding an upcoming organization-wide computer system change. Similarly, the product segment tracts can include separate initiatives for major product lines (e.g., custom database solutions) or even individual products of high priority (e.g., new products introducing new product lines). For each tract 212 and/or each initiative 213 itemized within the learning blueprint 211, overall budget caps can be assigned to assist the learning solution in obtaining, managing and delivering learning content that serves the strategies and priorities of the organization.

Referring again to FIG. 2a, the business strategy alignment process 200 initially receives a request 215 for learning services (a "learning effort request") from an individual or business unit of the organization. The learning effort request details what the individual or business unit submitting the request believes is an important learning need that requires a new or modified learning effort. According to embodiments of the invention, a learning effort request can be made in any form, including a verbal communication, a voicemail message, a letter, or an email message directed to a contact for the business strategy alignment module.

After receiving a learning effort request, an initial determination 220 is made regarding whether the request is addressable through training efforts or whether it would alternatively be best addressed through more simple measures like documentation or a newsletter produced by the resources of the requesting business unit of the organization. In the event that the learning effort request is not deemed suitable for the learning solution, at step 225 a rejection is sent to the requester. Alternatively, at 225, a query for a more detailed learning effort request is sent to the requester.

Whenever a learning effort request is deemed to present a learning need that is addressable by the learning solution, process 200 prepares 230 an initial action proposal for the requested learning effort in the form of a preliminary learning effort proposal ("preliminary LEP"). The preliminary LEP makes a pre-production judgment as to the type of delivery that will be most advantageous (Web-based course for self-paced instruction, a course involving live or virtual classroom time with an instructor, etc.) given the learning effort request and likely logistical/budget constraints, and whether the request should be addressed by creating wholly new learning content or by modifying the content of an existing learning effort.

In certain preferred embodiments of the invention as described below, the learning solution adopts a learning effort cost schedule that provides a standard set of prices or charges that will be "charged" to the requesting entity for each type of content development or delivery type that can be utilized in preparing a learning effort in response to a learning request. For example, a first rate could be charged for each hour of high-fidelity web-based training content developed, a second rate could be charged for each hour of low-fidelity computerized content developed, and a third rate could be charged for each hour of instructor-led training developed or ultimately delivered. Therefore, when a new learning request is received, the initial action proposal as detailed in the preliminary LEP gets mapped at step 240 into one of the tracts/initiatives in the learning blueprint 211 as appropriate. Alternatively, of course, the cost that will ultimately be charged to the requesting entity can be estimated in a custom manner on a case-by-case basis when necessary or preferred. Once a price or charge has been estimated for the initial action proposal, that estimated price is compared against the budget restraints for the tract and/or initiative to which the effort is mapped.

As will be readily appreciated by one of ordinary skill in the art, whenever a set cost schedule of standard prices for learning effort production is employed, it is in the best interest of the learning solution providers and learner organization to have these prices reflect the most accurate predictors of average cost necessary to produce such efforts. Therefore, it is imperative that mechanisms be available to review, modify and maintain such a cost schedule on an ongoing basis. Preferred mechanisms for accomplishing this are described in more detail below.

Referring again to FIG. 2a, at step 250 a validation check is made to assess whether the preliminary LEP is feasible given budget priority restraints imposed by the current learning blueprint. If it is not, process 200 returns to step 230 and revises its initial action proposal to produce a modified (e.g., scaled down or re-targeted within the learning blueprint) preliminary LEP. This modified preliminary LEP is then mapped to the learning blueprint (as before, again at step 240) and the validation check is repeated (at step 250). This process loop repeats itself until the validation check is successful, which indicates that the action proposal fits within business goals and priorities (as evidenced by, among other things, budget allocations associated with the learning blueprint). At this time, a finalized LEP is prepared 260 for use by the content management module 120. This LEP contains more detailed budget allocation information, delivery timelines, and content design requirements for use by the other modules of learning solution 100.

By using such a properly prepared LEP, the learning solution 100 according to preferred embodiments of the present invention can facilitate the dissemination of critical learning information by internally developing deliverable learning content that is consistent with the needs of a specific organization. By properly assimilating information regarding a learner organization's business objectives and strategies, the content management modules of the present invention are able to compile and manage critical instructional information and materials for targeted students in a logical, intuitive and valuable manner that is designed to enhance student receptivity and knowledge retention. In this regard, FIGS. 3-9, which depict various processes implemented within the content management module 120 and its course content development module by which customized course content materials are designed and produced in light of an LEP, will now be discussed.

Figure 3:
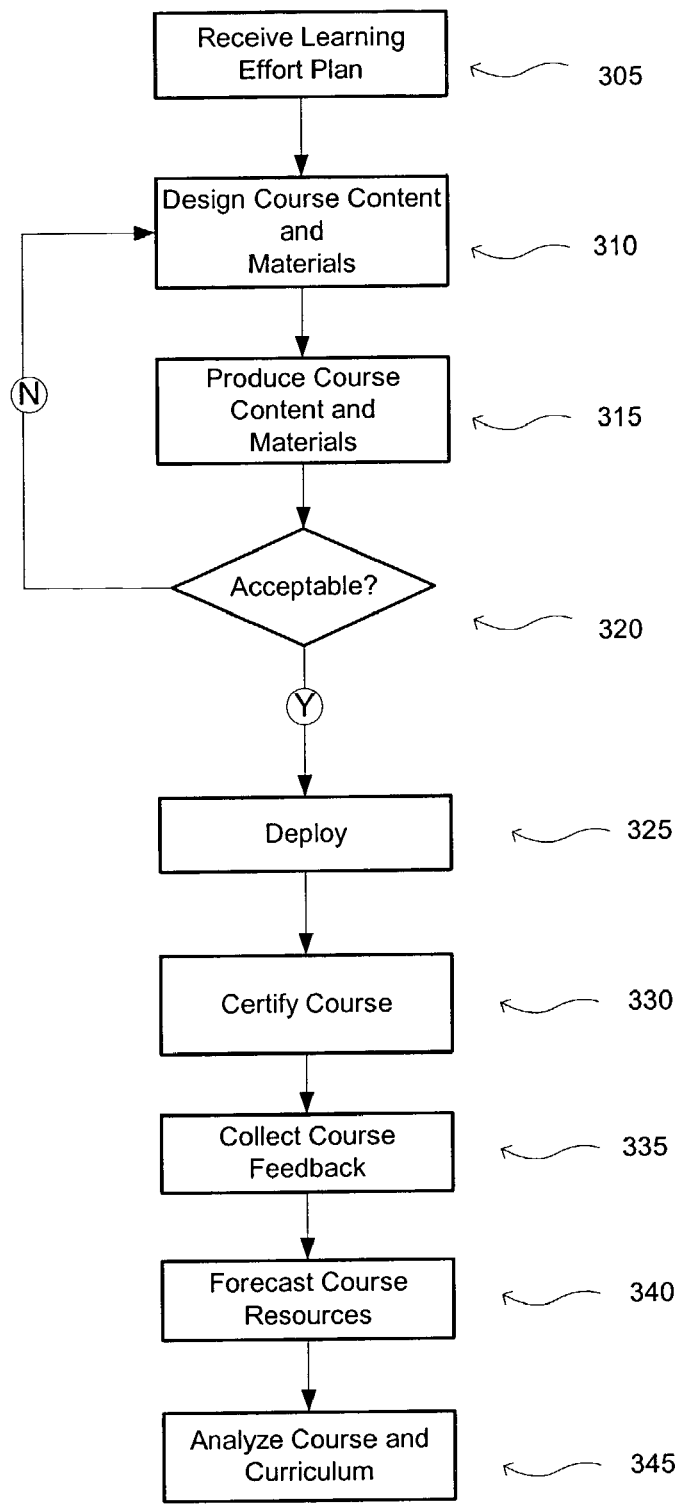
FIG. 3 is a flowchart illustrating a content development process in accordance with an embodiment of the invention.

A particular content development process 300 implemented in course content development modules of a learning solution 100 according to an embodiment is conceptually depicted in the flow diagram of FIG. 3. Specifically, FIG. 3 shows a content development process 300 which designs, produces, and deploys course content and materials, and then provides for iterative post-delivery review of the developed content and materials. Development process 300 embodies a combination of iterative steps that enable a learning solution to leverage benefits of the business strategy alignment module processes and thereby design, produce, and manage deliverable customized learning content internally for an organization's required learning efforts.

Content development process 300 starts by interfacing with business strategy alignment processes to receive information regarding the learning content that needs to be developed for a learning effort, such as by receiving a LEP produced according to the process 200 of FIG. 2a above. This passage of business strategy alignment information helps to ensure that any new or modified learning materials and content are always aligned with the business learning strategies and objectives of a licensing organization. The business strategy alignment information, such as in the form of a LEP, is then passed down (and possibly revised as described below) through the various subsequent steps of content development process 300, including content design, content production, and pre-deployment review, until it is ultimately deployed with any newly-developed deliverable learning content and/or materials through an interface with the processes of the delivery module.

Thus, the development process 300 begins at step 305 with the receipt and review of the finalized LEP from the business strategy alignment processes. As described above, the finalized LEP details, among other things, content design requirements as identified and prioritized by the business strategy alignment processes. The finalized LEP is used thereafter to create a high-level development plan and a detailed work plan, which are both described in greater detail below.

The finalized LEP is first used at step 310 to design course content and materials. In light of the content design requirements and other information contained in the LEP, the content design step 310 leverages technology and organization services to implement a series of functions, tests, and analyses to produce an initial layout of any new content or materials that need to be developed for a given learning effort. The functions, tests, and analyses performed during content design step 310 include performance strategy and role impact strategy to make an initial assessment regarding a recommended instructional design (i.e., whether to utilize computer delivered self-paced courses, instructor-led training ("ILT"), virtual classrooms, etc.). In making this initial design assessment, care is taken to perform audience analyses and environment analyses to ensure that the chosen instruction design is not incompatible with the logistics of the learning audience (e.g., whether it is feasible to expect the learners to be able to attend pre-scheduled live classes with an instructor) or with learning services resources (such as instructor/classroom availability, budget and development schedule constraints). The initial assessment will often also include basic media design (i.e., for a computer-delivered interactive course, this would include a layout of the types of audio, video, and graphical presentations and simulations that would be required or useful in teaching the subject matter) and indications as to whether subject matter experts ("SMEs") would be necessary for consultation.

After sufficiently evaluating course requirements, needs and impact analyses, and user surveys, design step 310 produces a development plan, a requirements document containing high-level design requirements. All of the information included in the initial design assessment is used to produce a development plan that is sensitive to budget and logistical constraints and delivery timelines detailed in the LEP, with the development plan then being referenced by the later steps of content development process 300.

After a development plan is obtained, a detailed work plan is produced to aid in resource utilization and scheduling downstream development efforts. This work plan provides a detailed layout regarding what course content materials will be developed, and how they will be developed, while adhering to the boundaries of the LEP so as to ensure that course content is aligned with an enterprise's business strategies. The results and/or conclusions detailed in both the development plan and work plan as produced from the various analyses performed during content design are then utilized for downstream content production, review, and the delivery deployment and preparation. This helps to ensure that the development of a course's deliverable learning content and materials remains consistent with the organization's business learning strategies and objectives and particular learning effort need (as reflected in the LEP and development plan). Suitable processes for accomplishing the designing of course content materials will be described in greater detail below with respect to FIG. 4 and FIG. 5.

Referring still to FIG. 3, in step 315, the course content materials are thereafter produced. Generally, production step 315 entails the coordinated utilization of electronic learning materials programmers and developers, SMEs, graphic artists, and learning administrators to carry out the work plan previously adopted in step 310. During content production, technology and organization services are leveraged to develop, license and build suitable learning content for the carefully designed course curricula. This content production step 315 can include, for example, subject matter information collection and organization via SMEs, web-based training ("WBT") learning content object development for self-paced learning courses that will be delivered via computer, ILT and virtual ILT ("v-ILT") curriculum layout and scheduling development, multi-media learning content development (including both pre-production and post-production development) for use in one or more courses of various types, packaging and integration with pre-existing learning content, negotiation of any licenses or rights to use purchased content, instructor development and training, and job-aid production. Suitable processes for accomplishing the production of course content and materials will be described in greater detail below with respect to FIG. 6a and FIG. 6b.

After the completion of the production step 315, a pre-deployment review is made at step 320 to determine whether the course content and materials are acceptable. This review step entails a quality check on any learning materials produced in step 315 to further ensure that the business strategies and goals of the learner organization are furthered by the newly created learning effort. If the course content and materials are acceptable, the process moves forward to step 325, otherwise the process returns to design step 310 as depicted. This pre-deployment review compares the produced content against the design requirements of the LEP and development plan to ensure that the overall course development, production, and packaging are acceptable (i.e., consistent with the licensing organization's business learning strategies and objectives) before the content is finalized and deployed for delivery. Step 315 therefore initiates a loop that prevents the deployment and delivery of unacceptable course content materials.

For example, in the event that additional information is necessary or that the learning content was not designed within budget or logistical constraints, redesign or modified production can be initiated until suitable customized content is obtained. As will be described below with respect to FIG. 4 through FIG. 7b, feedback can be provided upstream to the business strategy alignment processes to initiate the generation of revised content design requirements (such as in the form of a modified LEP). Suitable processes for accomplishing the pre-deployment review of produced course content and materials will be described in greater detail below with respect to FIG. 7a and FIG. 7b.

After the acceptance of the designed and produced learning course content and materials at pre-deployment review step 320, the new or revised content is deployed at step 325. This step includes delivery preparation and thus necessarily varies according to the delivery mechanism(s) selected for a particular learning effort. For computer delivered instruction objects and the like, this step can include formatting or versioning of any content objects to be compliant with industry standards of electronic learning content delivery (such as the SCORM standard), as well as tagging and cataloging of the content objects and otherwise packaging them to simplify their storage, retrieval, and ultimate delivery to learners. The deployment step concludes with any new (or modified) tagged and cataloged course content and materials being readied for delivery, such as by transmitting any electronic learning items to a course content warehouse (such as an electronically accessible database). During the tagging and cataloging of the individual course modules, the data within the course modules is meta-tagged to facilitate its reuse among different applications. Suitable processes for delivering and deploying accepted course content and materials will be described in greater detail below with respect to FIG. 8.

Following deployment, the new course materials are available for delivery to students in any of the manners as selected during the content design phase. As indicated above with respect to the discussion of FIG. 1, the mechanisms and media through which the delivery module 130 provides learning content to learners of the organization are adapted to service the overall business strategies and specific learning efforts needs of the organization by organizing delivery to learners in the most resource efficient and cost efficient manner. Suitable mechanisms and media by which learning content may be delivered to students according to embodiments of the present invention can include combinations of computer-delivered or web-based courses available over electronic networks (such as the Internet) for self-paced instruction, interactive virtual classroom instruction and related media (both video and animation) available over electronic networks which utilize instructors to lead classrooms of remotely located students, in person ILT, and paper-based products used in conjunction with by self-paced or instructor training.

As will be readily appreciated by one of ordinary skill in the art, once delivery has been commenced, certain useful data can be collected, including, for example, student course attendance, the time it takes for an average student to complete a self-paced course unit, student scores on tests, instructor hours, and the like. The data collected, such as by electronic tools associated with a the delivery module, can then be used in various post-delivery functions of content development process 300 as depicted by steps 330 through 345.

Once deployment of the new and/or modified course content and materials has occurred, post-deployment functions with respect to the learning effort/course content in question become active. The first post-deployment function as depicted in FIG. 3 is an administrative certification of the course at step 330. In the certification, a pilot version of the course content is offered to a small group wherein a field test is performed on the course software and materials to determine the effectiveness of the course materials on the group. Specifically, the certification tests are designed to determine whether certain benchmark performance metrics are satisfied. These benchmark metrics determine how well a course is designed and delivered and are measured by testing students, before and after taking the class, to quantify effectiveness parameters, such as knowledge retention rate. If the measured parameters are do not satisfy pre-defined expectations for the course materials, a notification is generated to indicate that a design change may be necessary.

Additionally, at step 330 the newly deployed course content and learning materials may undergo a review to make certain the materials are accessible to the appropriate students/learning efforts, and locatable through standard course catalog systems. Such post-deployment review and certification focuses on how the course content materials perform under actual delivery conditions versus how the content and materials are expected to perform based upon design and pre-deployment reviews. Certification can include both field test results and feedback and results from actual delivery of the deployed materials to target students, and, for example, may reflect timing issues (is the content able to be delivered at the appropriate times), usability (such as via student or instructor feedback), and student scores on assessments. Suitable processes for accomplishing the post-delivery certification of produced course content and materials will be described in greater detail below.

In step 335, post-delivery feedback is collected to assess the effectiveness of the course content and associated delivery mechanisms. Such feedback includes, but is not limited to, post-course student surveys, instructor comments, test result analysis, work-related impact analysis, etc. Resulting feedback data is tracked and compiled to provide learning administrators of the business strategy alignment and content development processes with the ability to track through objective and subjective feedback measures whether the customized course content and materials are indeed aligned with the business strategies and goals of the learner organization. Suitable processes for accomplishing the pre-deployment review of produced course content and materials will be described in greater detail below with respect to FIG. 9.

In step 340, the course resources necessary to support ongoing and future course delivery are forecasted, based, in part, on course demand estimates and usage analyses. These resource forecasts can detail to what extent certain course content is being underutilized or delivered at low rates, and to what extent certain course content needs to be made more easily acceptable to target learners. Additionally, certain performance metrics can be reviewed as discussed below to assess the efficiency of the development processes and the quality of newly developed content and materials.

In step 345, the course curriculum is analyzed in light of incoming data regarding the relative effectiveness of various ongoing learning efforts. Suitable processes for analyzing the data collected after delivery has begun are described in greater detail below with respect to FIG. 11. In analyzing the course content and curriculum in light of the data gathered in post-delivery steps 330, 335 and 340, the course development process 300 allows the course content module to initiate changes in current learning efforts and course offerings when optimal utilization of resources, and thus optimal learning, is not being achieved. In this manner, results of the ongoing content production step 315 can be communicated upstream to the content design step 310 to facilitate peer review and enable revisions to current design plans or even further upstream to initiate business strategy alignment level review if necessary.

Figure 4:
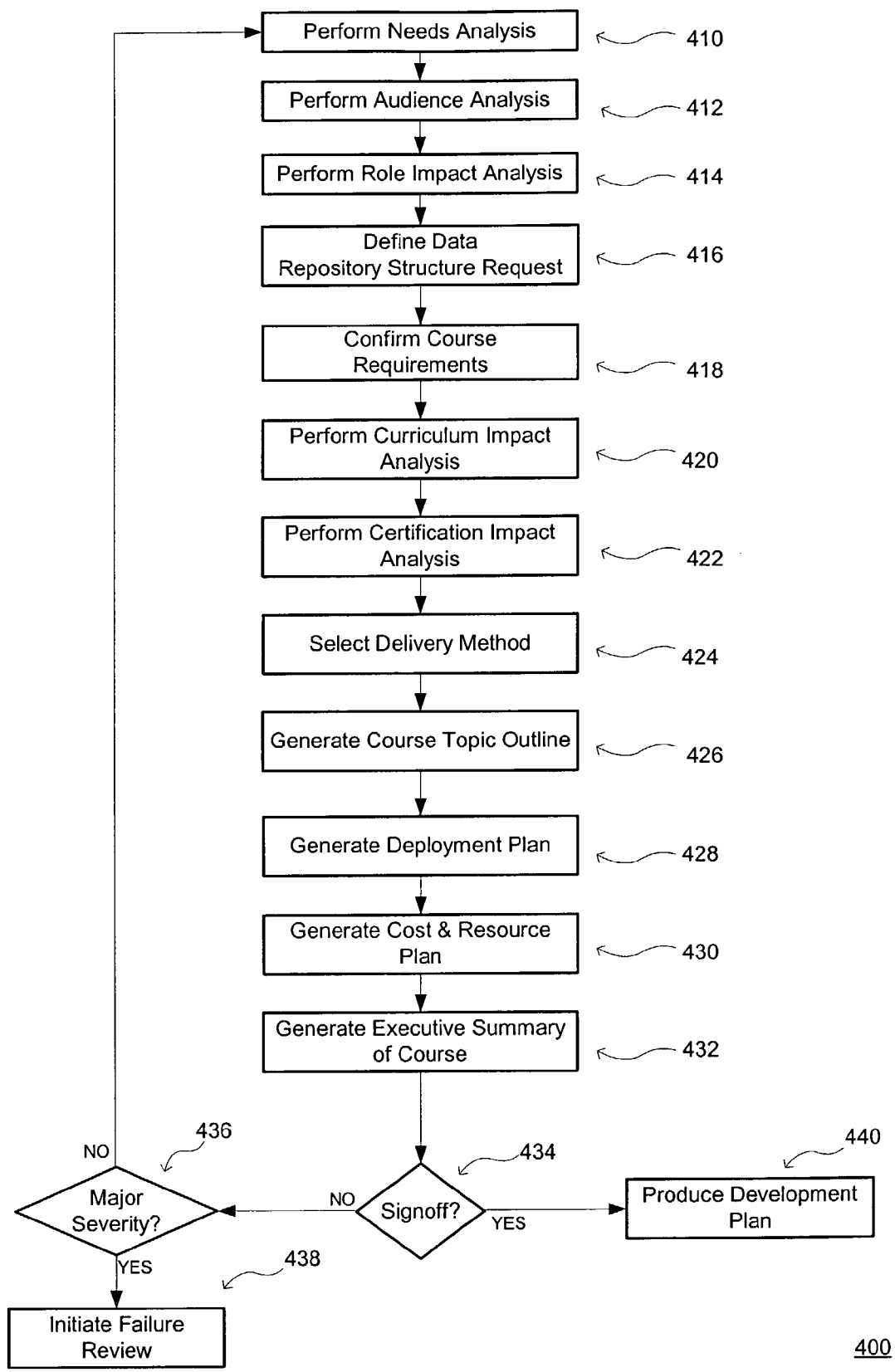
FIG. 4 is a flowchart illustrating the process for course content design in accordance with an embodiment of the invention.

FIG. 4 comprises a flowchart illustrating a process through which course content may be designed such that the content is strategically aligned with a learner organization's business objectives according an embodiment of the present invention. Turning to FIG. 4, the content design process 400 begins by reviewing the LEP in detail in steps 410 through 418. As such, a course needs analysis is performed first at step 410. This needs analysis entails a review of the LEP to determine the learning areas in demand by the enterprise for which the course is being designed, and is facilitated by the preliminary description of the course, delivery timelines, and course requirements provided by the business strategy alignment processes.

In step 412, an audience analysis is performed to determine the needs and preferences of the students who may enroll in the course. For example, this audience analysis can attempt to identify various factors regarding the requested learning effort which will indicate whether it would be most efficient to utilize computer-delivered self-paced courses, ILT traditional classroom-based courses, virtual classrooms (i.e., vILT), etc. In making this initial assessment, care is taken to ensure that the chosen instruction design is not incompatible with the logistics of the learning audience (e.g., whether it is feasible to expect the learners to be able to attend pre-scheduled live classes with an instructor) or with learning services resources (such as instructor/classroom availability, budget and development schedule constraints). This analysis and the needs analysis of step 510 allow the course requirements to be accurately defined.

Thereafter, in step 414, a role impact analysis is performed to determine the likely and/or desired impact the course will have on the outsourcing enterprise. This information be used to determiner what topics, points or issues need to be focused on in the learning effort to properly achieve the goal of the effort. In developing new content and materials, resources should be focused on having the target learners learn the concepts and skills that are most impactful (e.g., new to the learner and beneficial to the learner organization).

In step 416, a data repository structure is defined to the structure, number, size and type of course data modules required for the to-be-developed course materials. In so doing, the types of objects that will be needed by the new course are identified prior to development. This therefore reserves the logistical and technical resources necessary to produce the requisite learning content and materials. In step 418, the determined course requirements, including knowledge improvement goals and certification criteria, are confirmed against the needs of the business enterprise for which the course is being designed to ensure that the course requirements are aligned with the needs and objectives of the business enterprise. Once the LEP has been analyzed in detail, content design process begins to make incremental steps toward producing a solution plan for producing content and materials in response to the learning effort request.

In so doing, a curriculum impact analysis is next performed at step 420. In the curriculum impact analysis, the current curriculum offered by the entire learning solution to the organization is reviewed to determine whether a completely new course needs to be produced or whether, alternatively, an existing course can be modified and/or replaced. In the event that an existing course is modified, there may be, of course, the notable opportunity to reuse a significant portion of existing learning materials or course content. The curriculum impact analysis may ultimately lead to various modifications of the LEP in an effort to strengthen the course design or to lessen adverse curriculum effects.

Specifically, the curriculum impact analysis may comprise a review to determine how the goals, content, course outlines, and/or SCOs for a new course relate to those already developed for existing courses, i.e., whether there is content overlap between the needs of the new course and existing content or materials. Because learning effort courses are comprised of interoperable and interchangeable content chapters or, in the case of WBT courses, modules, it is possible that individual chapters or modules may be reused or shared by multiple efforts and courses. In preferred embodiments of the present invention, to facilitate the reuse and sharing of content chapters and objects, the chapters and modules are meta-tagged for identification purposes, and then cataloged in a central knowledge bank such that any change to a course module is changed in every course that uses it. In this manner, developers of new courses may streamline development by defining the overlapping SCOs to conform to the requirements of the new course.

Following analysis of curriculum impact, a certification impact analysis is performed at step 422. Certification impact analyses are performed to determine what certification criteria, if any, the particular learning effort needs to address and/or satisfy. Where a certification is desired, associated certification fulfillment criteria may impact the scope of training content covered by or type of delivery mechanisms employed in a given learning effort where, for example, certain lab time or focus group time, or standardized test passage, is required for the target learners to gain a desired certification.

Thereafter, in step 424, the results of the impact analyses at steps 420 and 422 are used to select the delivery method designed to maximize presentation efficacy and student retention (taking into account logistical concerns identified earlier as necessary). Additionally, at step 426 a course topic outline is generated. The course topic outline contains course background information as well as course chapter information that students may review while taking the course. Because the course topic outline provides a detailed overview of the course, it may be used as a roadmap to facilitate the development process, as well as to illustrate the architecture of the course according to its constituent course content modules or SCOs. Course topic outlines prepared after reviewing the LEP and any accompanying design documentation produced to date. SMEs may be consulted at this time, but typically are involved more frequently in later design stages as described below.

Once a course topic outline is produced, a deployment plan is generated at step 428 that defines the delivery methodology and completion time frame for the requested customized course content and associated materials. Next, in step 430, a cost and resource plan is generated that provides a revised estimate of the costs and operational resources needed to deploy the designed course. This estimate, of course, can be used to compare with the initial estimate and/or budget allocations provided by the business strategy alignment module while preparing the LEP as described above. In step 432, an executive summary of the course is generated. The executive summary provides a brief description of the course topic outline, course requirements, and resource usage and cost estimates to deploy the course, and is used in deciding whether to go forward with formulating a development planning.

In step 434, a determination is made whether the initial design of the learning effort satisfies its requirements. This determination takes into account all of the analyses performed in and factors identified from the previous steps (which may be detailed in the executive summary). If the initial design of the learning effort satisfies the defined requirements, the initial design is signed off and the process moves to step 440, otherwise the process moves to step 436. If content design process 400 reaches step 436, this is indicative of there having been identified some problem with the basic course design decisions reached in steps 424-432. At step 436, a determination is made whether it is a major failure in the course design that has identified. If a major failure has occurred, the process moves to step 438, otherwise the process returns to step 410. In step 438, a failure review request is sent to the business strategy alignment process to initiate a review, and possible redesign, of the basic course requirements as laid out in the LEP. The process 400 then ends until another new or modified LEP is received from the business strategy alignment module.

Figure 5:
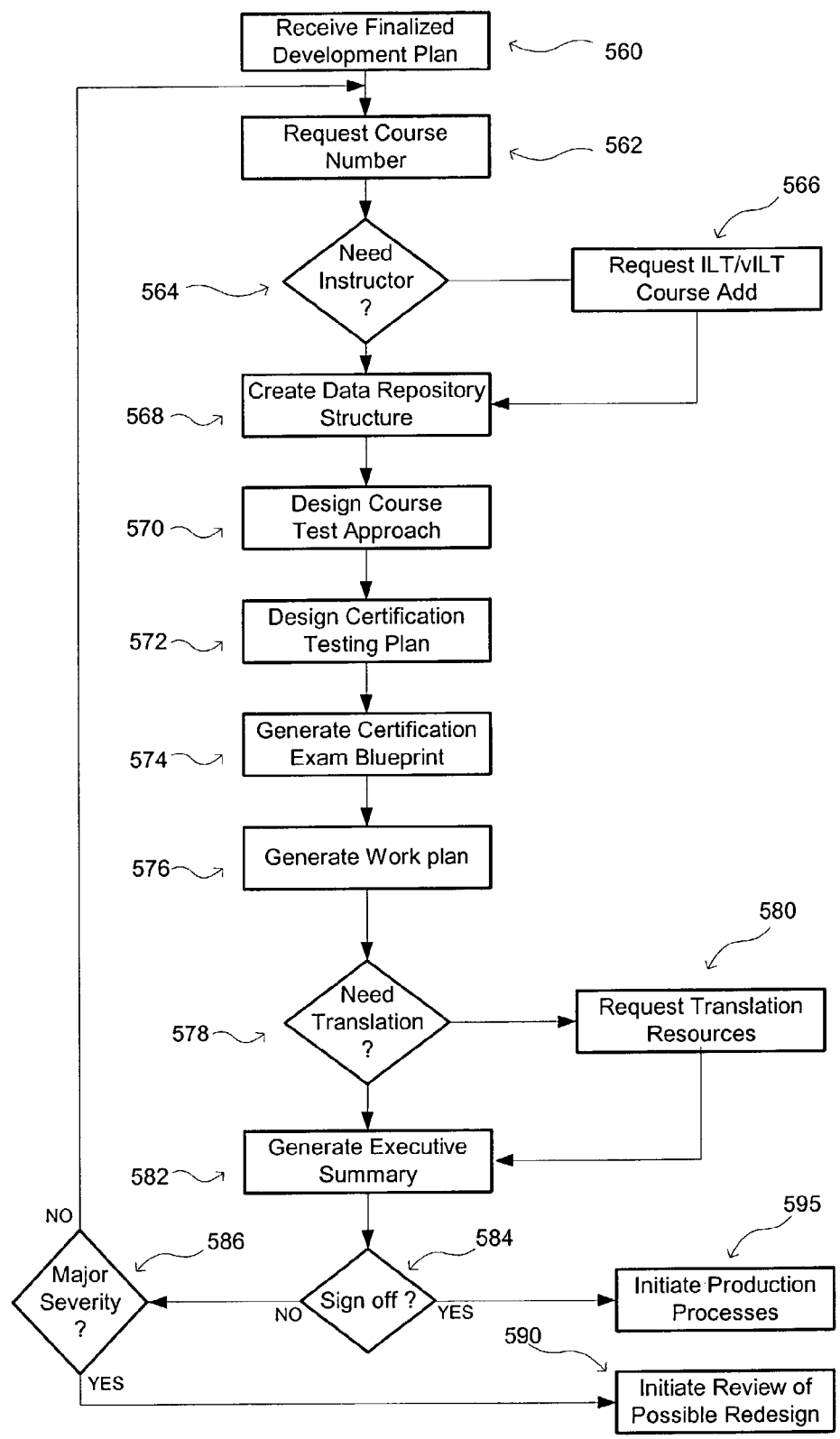
FIG. 5 is a flowchart illustrating the process for producing a development plan in accordance with an embodiment of the invention.

Thus, after steps 410 through 432 have been completed, and the initial design of the learning effort is found to satisfy the defined requirements review at step 434, the process 400 moves to step 440 where a development plan is produced in accordance with the planned design. The development plan reflects the products of steps 410-432 and describes course objectives and strategies and maps generally the sequential process for developing the course according to the subject matter and/or course type requirements by the various development steps and stages. The development plan is a high-level design document that is intended to be easily read and may be created according to any current word processing format, such as Microsoft Word. The development plan outlines the key activities that must be performed and milestones met to deliver the learning effort on the desired or required schedule. Where no errors or deficiencies in the general course outline, layout and cost plan for the learning effort are identified, processes for preparing a detailed and finalized design is ready to be initiated. FIG. 5 is a flowchart depicting design finalizing process 500 whereby the production of course content and materials is initiated in response to the creation of a development plan in accordance with an embodiment of the present invention. Turning to FIG. 5, the design finalizing process 500 begins at step 560 with the receipt of a course development plan (as produced in step 440 of FIG. 4). In step 562, a course number request is generated and sent to a learning management administrator (or electronic learning management system) for assignment or identification of a course number in the organization's catalog of learning solution courses. At step 564, if the designed learning effort will need an instructor to deliver the course content and/or materials (i.e., the learning effort will include either traditional ILT classroom or vILT classroom activity) a request to add a ILT/vILT course (thus flagging the potential need for an instructor) to the repository of offered classes is generated at step 566. If not, the design finalizing process 500 proceeds to step 568 directly.

In step 568, the data repository structure previously defined is created in preparation for newly created learning content and course materials data objects. Thereafter, at step 570, a course test approach is designed to measure the effectiveness of both the course design and the selected delivery method both during and after production. In step 572, a certification testing plan is designed. Certification testing is an important function of the content development modules according to certain embodiments of the present invention in that, unlike test on production approaches, certification tests are primarily aimed at determining whether the course content, as will be deployed, satisfies minimum certification requirements dictated by enterprise and business objectives as defined in the initial LEP. Thereafter, in step 574, a certification exam blueprint, detailing the specifics of the certification scheme, is generated to facilitate the execution of the certification testing plan from step 572.

In step 576, a course work plan is generated, which itemizes, schedules, and assigns the work necessary to effectuate the timely deployment of the designed course. Unlike the high-level development plan, the course work plan contains a detailed schedule for course development in that resource assignments are made at a lower level of detail. Generally, the work plan comprises an allocation of responsibilities and tasks, such as in a Gantt chart format, wherein specific tasks and activities having completion deadlines are assigned to individual groups and people specializing in different areas of development (multi-media programmers, SMEs, etc.). The work plan uses preset estimates of the probable resources, labor efforts and costs outlays for a given development task or activity to forecast the expected percentage effort of each task/activity, and associates a development manager or instructional content designer to a specific task, or tasks, to ensure that the course is developed in accordance with the expected forecasts. The work plan also associates time milestones, such as the general release milestone, with a specific course development project. The course work plan may be stored in any spreadsheet format, such as Microsoft Excel, and represents the general schedule for the course development process.

Once a work plan has been completed, a check is performed at step 578 as to whether a translation is necessary of the course materials. If a translation will be needed of the finalized materials, a translation resources request is sent at step 580 to arrange translation services for availability when finalized versions of the customized learning effort content and materials are completed in a first language. Thereafter, process 500 eventually proceeds to step 582 as depicted where an executive summary is generated that briefly describes the course design test approach, the certification testing plan and the course work plan.

In step 584, a determination is made whether the design test approach, certification testing plan, and course work plan are satisfactory for initialization of the production of learning content and materials according to the work plan. If everything is satisfactory, the process 500 signs off on the design documents and forwards them to suitable content production processes at step 595. Otherwise, if the design documents are not satisfactory, the process 500 moves to step 586 where a determination is made whether the deficiencies in the design test approach, certification testing plan, and/or course work plan are of a major severity. If they are not of major severity, the process returns to step 562 as indicated. If the reasons underlying the rejection of the design are found at step 586 to stem from major severity deficiencies in the design (e.g., major over-budget, will not meet hard delivery deadline, etc.) the process 500 proceeds to step 590. In step 590, a notification of sign-off failure is sent to further upstream in the design processes to initiate a review, and possible redesign, of the course. While a complete failure to satisfy the basic LEP requirements is uncommon at this point, it is possible that this notification of sign-off failure could be sent further upstream to the business strategy alignment module to signify a possible need to review and/or revise basic LEP requirements. Nevertheless, once the production process is initiated at step 595, the design finalization process 500 as implemented by the content development module concludes for the current learning effort.

Figure 6A:
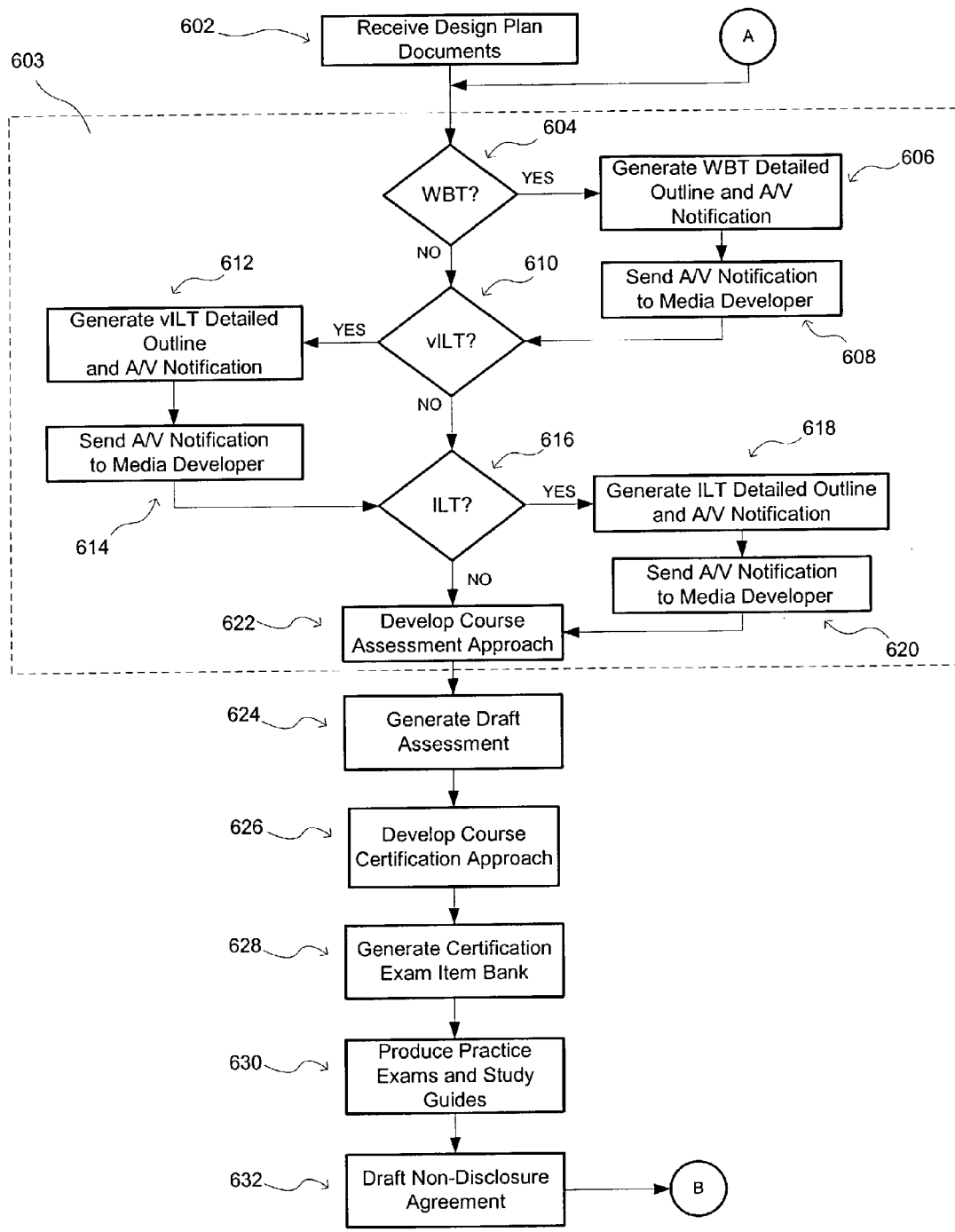
FIG. 6a and FIG. 6b are flowcharts illustrating a process for course content production in accordance with an embodiment of the invention.
Figure 6B:
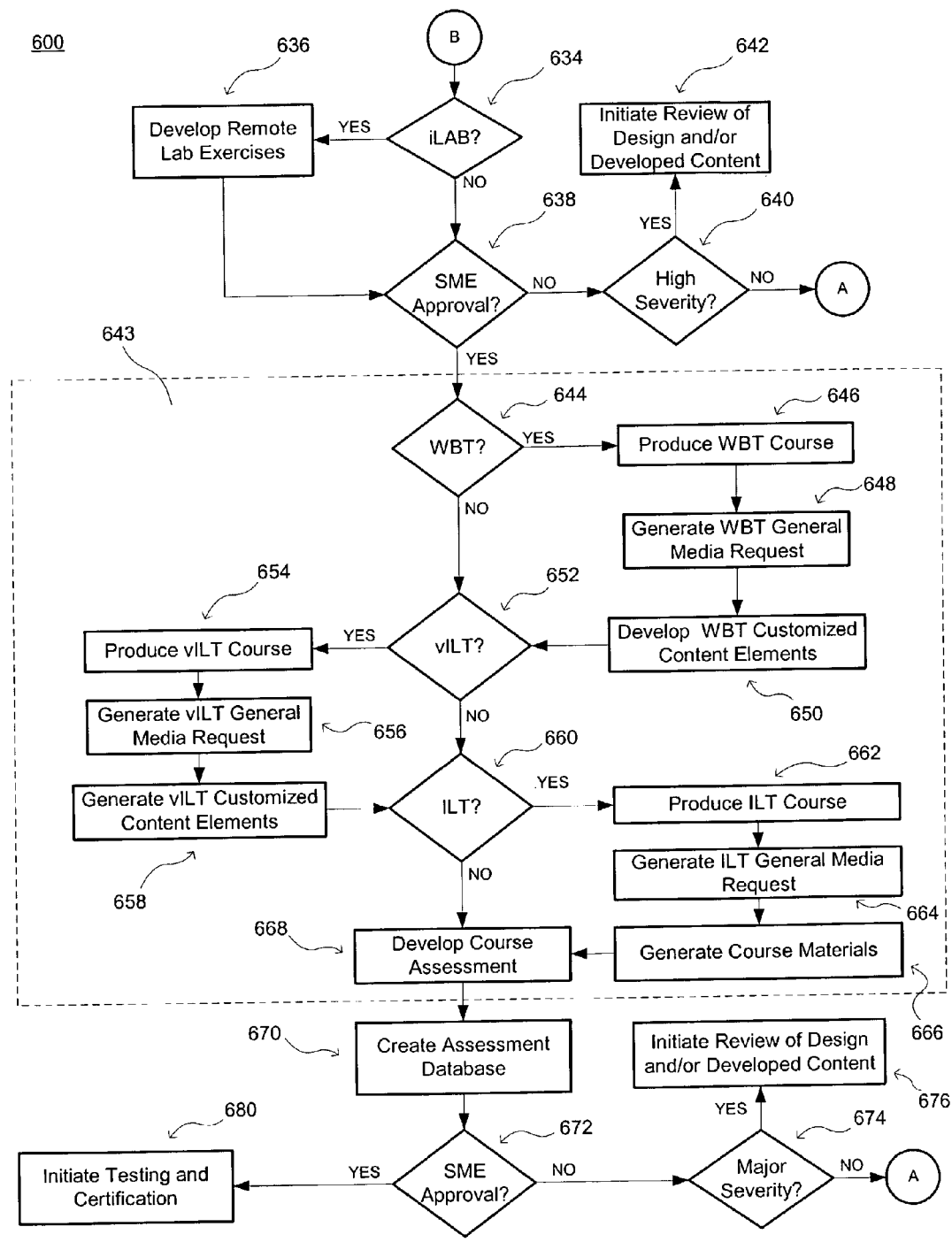

FIGS. 6a and 6b are flowcharts collectively illustrating a production process for producing course content with respect to course design requirements according to one embodiment of the present invention. Turning first to FIG. 6a, the production process 600 begins at step 602 with receipt of the design plan documents (i.e., development and work plan) from the content design processes and then with a series of pre-production steps (designated collectively as 603). These pre-production steps 603 are executed to facilitate the overall production and deployment of the course content and associated materials by creating detailed content outlines for the various delivery media employed in the course design and identifying a suitable assessment approach for the content and media combinations.

In particular, once the design plan documents are received at step 602, the production process 600 begins the pre-production steps 603 with a check at step 604 regarding whether web-based training ("WBT") products are needed to produce the course (as indicated in the LEP, work plan, and development plan). For example, in the work plan a web-based training object designed for the learning effort may be characterized as either "Web Hi-Fi" or "Web Lo-Fi." In such cases, a "Web Hi-Fi" product uses interactive media, video and animation, to build and develop student skills, while a "Web Lo-Fi" product is focused on the knowledge development of the end-users and therefore uses less bandwidth media. If such WBT functionality is required, the process proceeds to step 606 as indicated, otherwise the process moves to step 610. If production process 600 reaches step 606, a WBT detailed course content outline and audio/video ("A/V") notification are generated. The WBT detailed outline describes the WBT functions and applications required for course deployment and delivery. The detailed course content outline contains a description of the modules, or chapters, that comprise the course. In this outline, several topics are discussed. A first topic is the course background information, which may be comprised of course content and associated tests, or quizzes. A second topic may comprise an exercise, such as an associated lab (e.g., demonstrations, virtualized labs and remote labs), and an associated quiz. In this manner, WBT training offers students the opportunity to participate in emulated remote interactive labs using suitable electronic communication and emulation technology. Thus, such remote labs allow students to remotely access computers on which actual labs reside, so that the students may participate in lab exercise from a remote location (e.g., home, work, school, etc.). Specifically, for example, a student's client computer may access course and lab materials (including, e.g., descriptions of lab exercises) from the course content server. Thereafter, the student could then launch a remote lab application that establishes a connection to remote lab hardware that in turn provides the necessary demonstration and/or lab emulations services as is known in the art. These services can thus allow students to manipulate various pieces of lab equipment to execute various hands-on lab exercises. In step 608, the generated WBT A/V notification is sent to the media developer responsible for developing any necessary A/V content (sound and video files that may be incorporated into WBT content objects), and serves as a development request to the media developer. The process then proceeds to step 610.

In step 610, a determination is made whether the course will require the use of a vILT classroom. As described above, a vILT classroom is a "virtual" on-line classroom that allows students from remote locations to attend the same class, which may be taught by an instructor who is also remotely located. The information in a vILT classroom is presented synchronously, requiring students to login at a specific time and restricting access to the classroom information until the instructor presents the information in class. If a vILT classroom is required, the process proceeds to step 612, otherwise the process moves to step 616.

In step 612, a vILT detailed course content outline and audio/video notification are generated. The vILT detailed course content outline, similar to the WBT detailed course content outline, describes the vILT functions and applications required for course deployment and delivery. Thereafter in step 614, the generated vILT A/V notification is sent to the media developer responsible for developing the A/V applications, and serves as a development request to the media developer. The process proceeds to step 616.

In step 616, a determination is made whether the course will require the use of a classroom for instructor led training. An ILT classroom is a traditional classroom wherein the instructor and students are located in the same physical location. Like in a vILT classroom, the information in an ILT classroom is presented synchronously, requiring students to attend class at a specific time and restricting access to classroom information until presented by the instructor. In ILT classrooms, however, instructors may use paper-based products to teach conventional classroom courses. If an ILT classroom is required, the process proceeds to step 618, otherwise the process moves to step 622.

In step 618, an ILT detailed course outline and A/V notification are generated. The ILT detailed course content outline describes the ILT functions, subject matter areas, and instruction applications and support required for course deployment and delivery. In step 620, the generated ILT A/V notification is sent to the media developer responsible for developing the required A/V applications, and serves as a development request to the media developer. The process proceeds to step 622.

In step 622, a course assessment approach is developed. The course assessments utilized for any given course can be a series of formal and informal tests or questionnaires submitted to learners in an effort to measure both student learning retention and satisfaction with the course. Course assessments can be given in various forms depending upon the course delivery mechanism, course type, etc. In step 624, drafts of various course assessments are generated for later review and acceptance by SMEs. In step 626, a course certification approach is developed. Course certifications define goal metrics tests for measuring those metrics that are specifically chosen due to their potential to demonstrate whether the course requirements are adequately satisfied by the newly-developed course. After the course certification approach is developed, a certification exam item bank could optionally be generated at step 628. A certification exam item bank is a repository for holding various test or assessment questions that may be incorporated into various assessments for the learning effort.

In step 630, practice exams and study guides are produced. Students enrolled in the course may later use the exams and study guides to increase their learning retention rate and to measure their progress development while enrolled in the course. Optionally, at step 632, a non-disclosure agreement ("NDA") is drafted, if necessary. Students enrolled in the course may be required to execute an NDA to preserve the confidentiality of proprietary information presented during the administration of the course.

Following the flow of production process 600 now to FIG. 6b, it is seen that next in step 634, a determination is made whether the course will employ interactive remote laboratory technologies that enable students to log onto remote computers, workstations, or networks to conduct laboratory assignments. If the designed course utilizes remote lab technologies, the process proceeds to step 636, otherwise the process moves to step 638. In step 636, the required remote lab exercises are developed. The process proceeds to step 638.

In step 638, the SMEs review and ultimately approve or reject the course, as designed and production planned, including content, delivery mechanism, organization, and assessment approach. If the course is approved the process moves to step 644, otherwise the process proceeds to step 640. In step 640, a determination is made as to whether the SME rejections are of a higher severity level. If the rejections are of a higher severity level, the process proceeds to step 642, otherwise the process returns to FIG. 6a, step 602, where the pre-production steps 603 are then re-executed. In step 642, a SME approval failure notification is sent to initiate a review, and possible redesign, of the course content to earlier stages of the development, such by revisiting various assessments and plans made or adopted in the upstream steps depicted in FIGS. 2a, and 3-5.

When SME approval is ultimately obtained at 638, the production process proceeds through the learning material production steps (designated collectively as 643). The learning material production steps 643 operate generally in similar manner to, and largely in response to the results of, the pre-production steps 603. Specifically, in step 644, a determination is made whether WBT Technology is needed to deploy the course. If the course requires WBT applications, the process proceeds to step 646, otherwise the process moves to step 652. In step 646, the WBT course is produced by developing the WBT applications and integrating them into the course content and materials that are presented during the administration of the course. In step 648, a WBT general media request is sent to the media developer responsible for developing the media applications. In step 650, the WBT courseware (learning objects, assessment objects, customized presentation templates, etc.) are developed according to the detailed outline adopted at step 606. The production process 600 then proceeds to step 652.

In step 652, a determination is made whether the course will require the use of a vILT classroom. If a vILT classroom is required, the process proceeds to step 654, otherwise the process moves to step 660. In step 654, the vILT course is produced by developing the vILT classroom applications and integrating them into the course content and materials to be presented during the administration of the course. In step 656, a vILT general media request is sent to the media developer responsible for developing the media applications. In step 658, the vILT courseware, including any electronic or printed presentation materials and aids and course are developed. The process 600 then proceeds to step 660.

In step 660, a determination is made whether the course will require the use of an ILT classroom. If an ILT classroom is required, the process proceeds to step 662, otherwise the process moves to step 668. In step 662, the ILT course is produced by developing the ILT classroom applications and integrating them into the course content and materials to be presented during the administration of the course. In step 664, an ILT general media request is sent to the media developer responsible for developing the media applications. In step 666, the ILT course materials, including any printed handouts and electronic media presentation materials, are developed. The process 600 then proceeds to step 668.

In step 668, finalized course assessments are developed in light of the courseware and materials produced in steps 650, 658, and 666. An assessment spreadsheet documenting the information and evaluations of the course assessment is then created, step 670.

In step 672, the subject matter experts approve or reject the course and software applications, as designed and planned. If the course is approved the process moves to step 680, and ends; otherwise the process proceeds to step 674. In step 674, a determination is made as to whether the SME rejections are of a major severity level. If the rejections are of a major severity level, the process proceeds to step 676, otherwise the process returns to FIG. 6a, step 602, where the pre-production processes are re-executed. In step 676, a SME approval failure notification is sent to initiate a review, and possible redesign, of the developed course content to earlier stages of is production, such by revisiting various assessments and plans made or adopted in the upstream steps depicted in FIGS. 2a, 3-5, and 6a.

The process then moves to step 680, where testing and certification of the produced content and materials is initiated and the process 600 then ends.

Figure 7A:
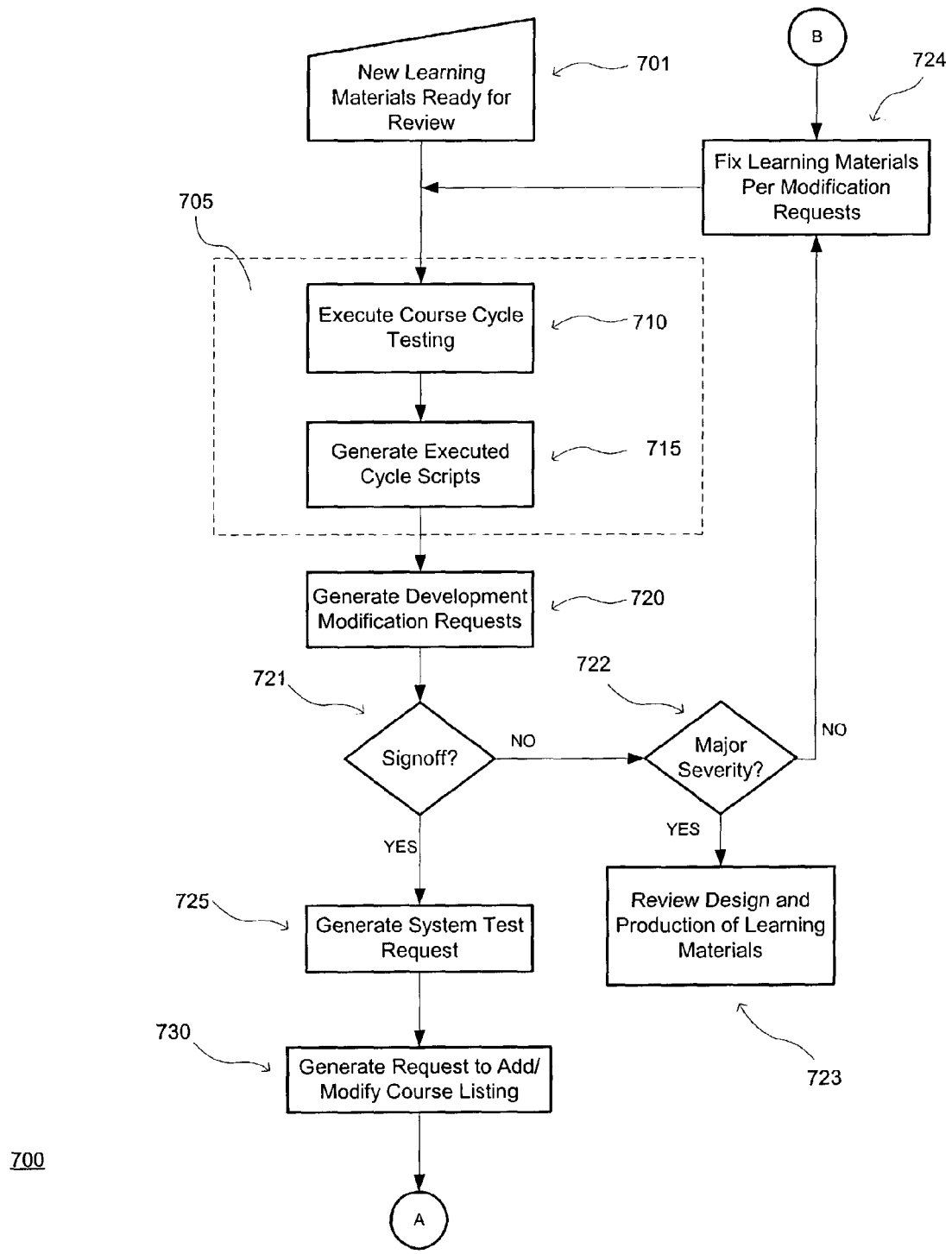
FIG. 7a and FIG. 7b are a flowcharts illustrating a process for reviewing course content and materials prior to deployment in accordance with an embodiment of the invention.
Figure 7B:
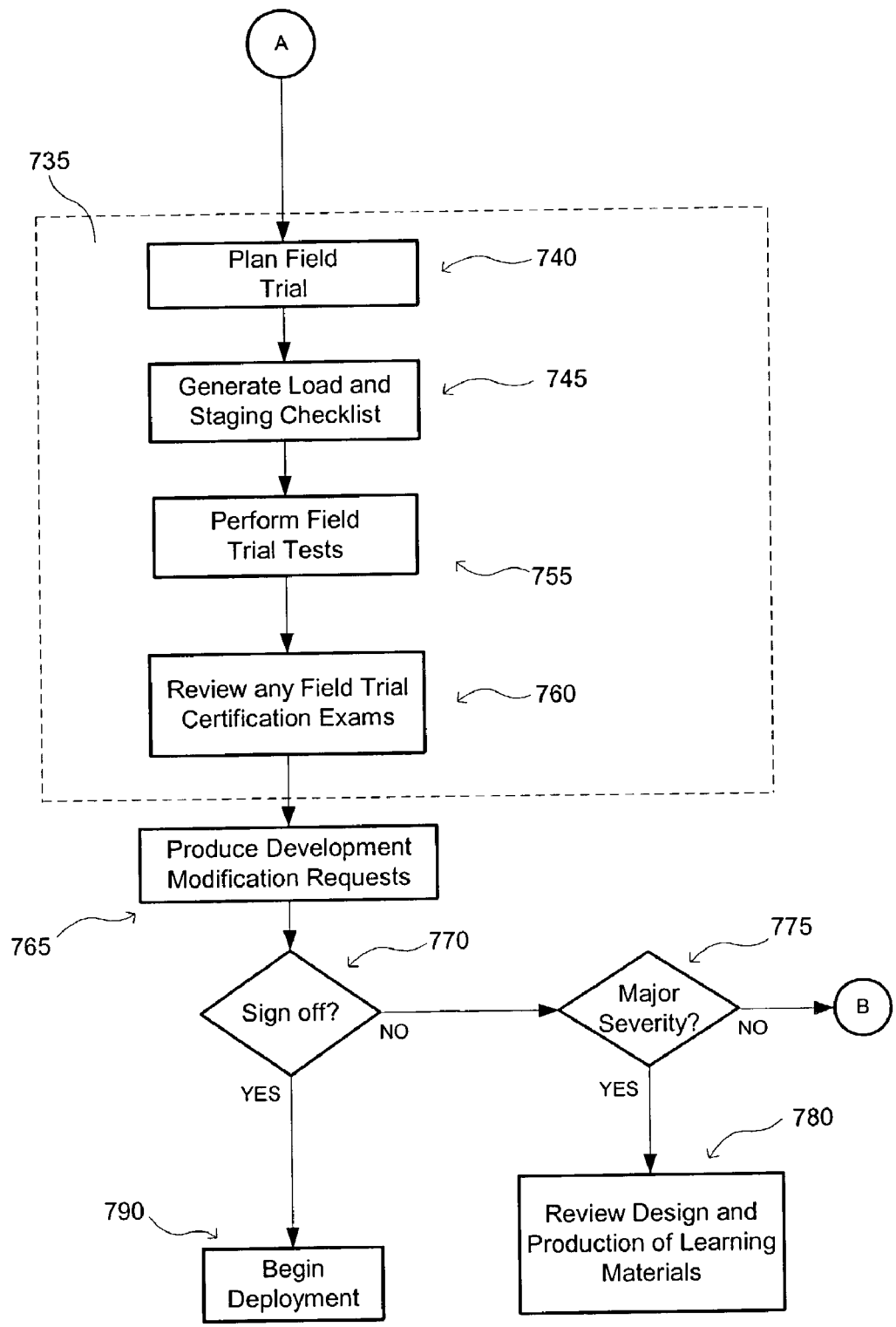

FIG. 7a and FIG. 7b are flowcharts that collectively illustrate a process for reviewing and then accepting or rejecting course content and materials with respect to course design requirements according to an embodiment of the present invention. As will be understood by one of ordinary skill in the art, the review process 700 depicted in FIG. 7a and FIG. 7b can be advantageously employed by a content development module to achieve step 320 depicted in FIG. 3. The review process 700 begins in steps 705 through 724 with one or more "alpha" tests to measure the robustness of any electronically deliverable learning content and/or its operation in conjunction with any electronic delivery mechanisms employed by the organization. Specifically, one or more alpha-testing cycles 705 are initiated in step 710 with the execution of cycle tests (e.g., cycles of increasingly more robust automated testing particularly useful for WBT SCOs and other digital content and electronic delivery mechanisms). In step 715, reports from the executed cycle testing are generated. The information contained in the reports concerns, but is not limited to, WBT technologies, asynchronous computer-delivery, and vILT classrooms. In step 720, any request for development modifications (software bug fixes, reworked content or multimedia, etc.) are generated, which facilitates the processing of necessary corrections identified during testing. In step 725, a system test request is generated and sent to the technical staff of the development module. This request causes the new learning effort course materials to be moved to an appropriate environment for testing cooperatively performed by technical staff and content developers.

In step 730, a course add request is generated and sent to the learning management system administrator, which processes the request by adding the assigned course number to the catalog of available courses. At this time, the course is ready for a limited release for filed testing purposes.

To perform field tests, the review process 700 enters a "beta" tests phase 735, comprising steps 740 through 760. Specifically, in step 740, a field trial for the deployment of the course is planned. Based on the steps defined in the field trial plan, a load and staging checklist is generated, step 745. This checklist facilitates the execution of the proposed course field test by listing the individual steps of the field test. Suitable field trials, as commonly used in the art of electronic communication systems, are performed according to the staging and load checklist at step 755.

During the field trial, it is possible that a course is presented to a test sample of students. In situations where the newly developed learning effort course being field tested is part of a certification program in the learner organization, the test sample students will be given certification exams. The results of these certification exams are then reviewed at step 760 to gauge the success of the new learning effort in obtaining certifications. In step 765, requests for any necessary development modifications are made (similar in manner to step 720 above) taking into account any problems or deficiencies identified in the beta testing phase 735.

In step 770, a determination is made whether the course has passed the field test. If the course field test is signed off then the process moves to step 790 (deployment), and ends. Otherwise, the process proceeds to step 775. In step 775, a determination is made as to whether the test failures are of a major severity level. If the failures are of a major severity level, the process moves to step 780, otherwise the process returns to step 710, where the course cycle tests are re-executed after reasons for the minor severity beta test failures are resolved.

In step 780, a failure notification is sent to initiate a review, and possible redesign or redevelopment, of the course and constituent course materials and content. In this iterative manner, once all content has been signed off and certified, the process thereafter ends with the deployment of the course at step 790.

Figure 8:
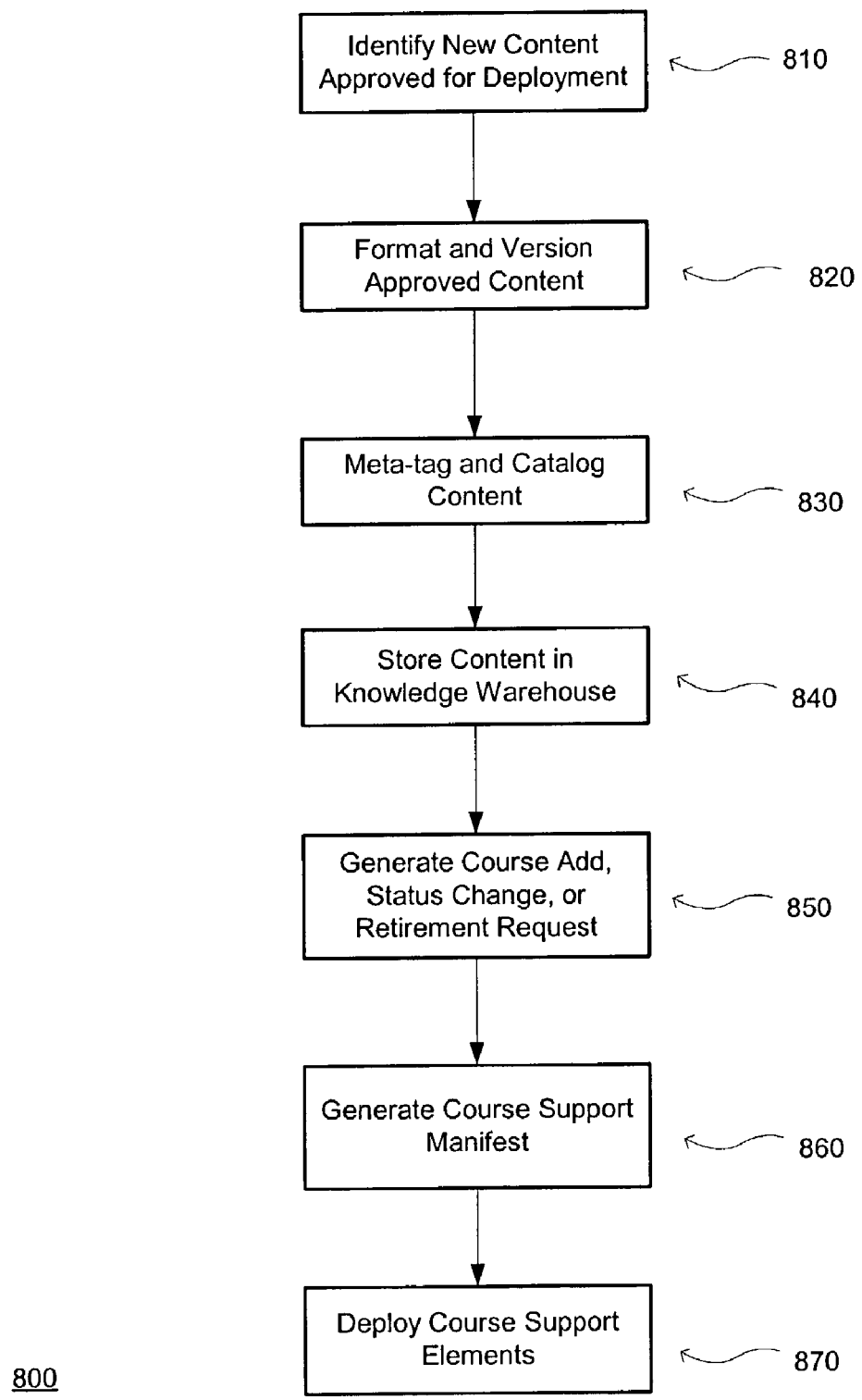
FIG. 8 is a flowchart illustrating the process for course content deployment in accordance with an embodiment of the invention.

FIG. 8 is a flowchart illustrating process for performing step 325, which is course content deployment consistent with course design requirements. The deployment process 800 begins at step 810 with an identification of all newly developed content that must be deployed for use in the new learning effort. Understandably, any new content would need to be formatted and versioned to be compatible or consistent with previously developed or obtained content or with delivery or cataloging mechanisms or conventions employed within the overall learning solution (such as the storage of SCOs in for delivery in a manner compliant with the SCORM standard). The content ready for deployment is therefore formatted and versioned as needed at step 820. Additionally, any such electronic learning content would also need to be tagged appropriately and placed into data stores to facilitate organization, delivery upon demand, and location/reuse of the content for the current and future learning efforts. Thus, new content objects and materials are meta-tagged and cataloged at step 830 to facilitate tracking and use. Any appropriately formatted, versioned and meta-tagged learning content objects are thereafter stored in an accessible knowledge warehouse database at step 840 such as to enable delivery to learners as necessary and to have the objects available for future use in the development of new learning efforts. Next, in step 850, appropriate steps are taken to add the new learning effort to the current curriculum offerings, such as via the creation and submission of a course add, status change, or retirement request sent to the learning management system administrator or entered into an electronic learning management system. This request, for example, could ask that a new course, corresponding to the recently deployed learning content and materials, be added to a central catalog of offered courses. Electronically deliverable content and materials are thereafter positioned for delivery.

The deployment process 800 continues at step 860 with the generation and circulation of a course support manifest. This manifest includes a listing of the type, amount and timeframe of needs for applications, tools and resources necessary to support course deployment. These can include requests for the printing of printed learning materials, the tentative reservation of instructor time, the reservation of vILT and interactive remote lab resources, etc. The course support elements are thereafter deployed in response to the course support manifest at step 870, and the deployment process 800 ends with the new learning effort being completely ready for delivery.

As will be readily appreciated by one of ordinary skill in the art, it will not always be the best approach for the learning solution 100 to internally develop deliverable learning content in response to a learning effort requested by the organization. Often, time constraints, subject matter constraints, and other logistical issues may make it more cost effective for the learning solution to purchase or license previously developed learning content (completely ready for delivery to learners or otherwise) or commission the development of suitable learning content from third party providers. For example, if the organization needed employee training for new computer system, it may be more efficient to purchase training from or reuse training materials from the provider of the new computer system as opposed to creating new learning content internally from scratch. Therefore, the content management module 120 according to embodiments of the invention also contains processes that enable the procurement of third party learning content and services as well as integrating that content and services for delivery and administration within the control of the learning solution.

As was the case with internally developed learning content, any learning content purchased or licensed from third party providers would need to meet the detailed budget allocation information, delivery timelines, and content design requirements established by the business strategy alignment module (such as is detailed in a finalized LEP). Also similar to how was described above with respect to the content development process 300, any content obtained from third party sources would be certified, formatted, versioned, tagged and cataloged in roughly the same manner as internally developed learning content materials. After receiving third party content, the content management module still, like in process 300, compares the content against requirements established by the business alignment module. Any electronic learning content would then be versioned and/or formatted to be compatible or consistent with internally developed content (such as if, for example, digital self-paced learning content materials need to be converted into SCORM standard compliant format for later asynchronous electronic delivery to students). Such electronic learning content would then be tagged appropriately and placed into data stores to facilitate organization, delivery upon demand, and location/reuse of the content for the current and future learning efforts. In this manner, content management module 120 allows the learning solution 100 to take advantage of the most efficient mechanisms for assembling appropriate learning content for efforts needed by the organization.

Various processes for collecting feedback on produced course content from course assessments can be advantageously employed to carry out step 355 for FIG. 3. In particular, assessments may be executed to determine the efficacy of the course. As is generally understood, the efficacy of a learning technologies may be determined by different types assessments to measure student knowledge, retention before, after, and several months after, respectively, from the date of a specific course to determine student retention rates.

The business strategy alignment module and content management module also estimate development costs for an individual course by comparing previous cost estimates with the actual development costs incurred by the course content module 120. This is accomplished by calculating a ratio of actual costs to estimated costs to determine one or more development ratios. These development ratios operate as an internal performance metric that is used to measure the accuracy of previous cost estimates. Specifically, the learning solution evaluates the development ratio to determine whether future cost estimates should be increased or decreased from previous estimates, increasing the accuracy of future costs forecasting and allowing for the fixed billing of development costs.

Figure 9:
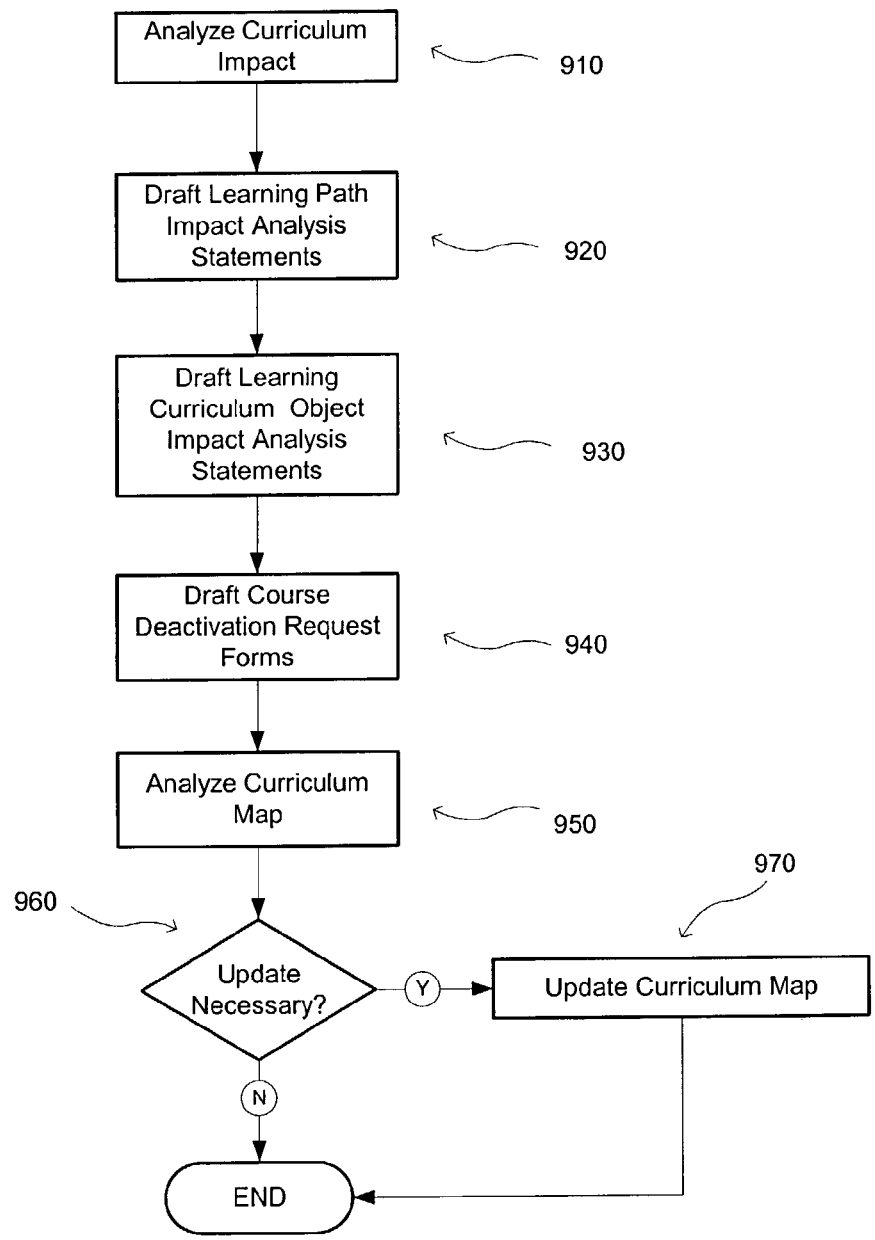
FIG. 9 is a flowchart illustrating the process for analyzing course curriculum in accordance with an embodiment of the invention.

FIG. 9 is a flowchart illustrating a process for analyzing course curriculum in accordance with course design requirements in embodiments of the present invention (such as may be utilized at step 340 of FIG. 3). The analyzing process 900 begins at step 910 with a curriculum impact analysis. This analysis includes a review regarding how a new learning effort, such as a new course offering or change in an existing course, impacts the overall curriculum being offered by the learning solution. The results of this analysis are used to draft a learning path impact analysis statement, step 920, and a learning curriculum object impact analysis statement, step 930. The learning path impact statement is a forward looking document that identifies how the new learning effort materials effect overall curriculum, such as by remedying a previous topical area weakness or satisfying an outstanding business priorities (and thus triggering a re-prioritization of remaining learning needs). The curriculum object impact statement is similar in composition and purpose, but instead focuses upon changes that have been made to the various data stores SCOs.

In step 940, course deactivation request forms are drafted and submitted. After the course expires, and thus is no longer taught, the course deactivation forms may be used to notify the learning management administrator that the course is to be deactivated and removed from the catalog database of offered courses such that resources are no longer wasted on the course. Finally, the course curriculum map is analyzed at step 950 in terms of having complete course offerings, depth and breadth of coverage among various courses, and whether the current courses provide up to date (i.e., not outdated) instruction. Using the results of this analysis, a determination is made at step 960 whether the course curriculum map should be updated. If the course curriculum needs to be updated, an updated curriculum map is drafted at step 970. This updated map can thereafter be used in both the design and phases of the content development module and in various prioritization operations of learning efforts, such as by a business strategy alignment module.

After the course content has been developed and satisfactorily passed the certification exams, the course system applications must be developed to facilitate the delivery of course content. Furthermore, it may be necessary to execute content license agreements among the developers of the course content and the learner organizations to ensure that the course content is legally delivered to students.

Embodiments of the business driven learning solution incorporating a content development module according to the present invention are preferably implemented in a network of learning platforms that together provide the electronic tools and information sharing capabilities needed by a learning solution services provider to efficiently develop course content according to the business desires of a complex learner organization. The platforms provide coordination and synchronization of learning content development among the coordinated learning process modules to ensure that learning content is aligned with a leaner organization's strategic goals. Such content development network comprises a resources synchronization platform, a content development platform, an electronic delivery platform, and a learning administration platform, all of which communicating electronically with one another.

While exemplary embodiments of the invention have been shown and described herein, it will be obvious to those skilled in the art such embodiments are provided by way of example only. As such, it will be apparent that the order of some of the steps that comprise the processes depicted and described herein may be altered, such as, for example, to have non-order dependant steps occur simultaneously with other steps or in different orders than that depicted above, without departing from the invention. Numerous other insubstantial variations, changes, and substitutions will be apparent to those skilled in the art without departing from the scope of the invention disclosed herein. Accordingly, it is intended that the invention be limited only by the spirit and scope by the claims as follows.

What is claimed is:

1. A computer-implemented method for preparing course content and materials for instructing employees wherein said content and materials are to be aligned with strategic business goals and priorities of an organization, said computer-implemented method comprising the following steps executed on a computer:

receiving business goals of the organization, said business goals having priorities established relative to one another by said organization;

generating preliminary learning effort proposals by receiving requests for learning from said organization;

receiving validated learning effort proposals from said organization, the feasibility of said preliminary learning effort proposals having been assessed by said organization;

designing courses associated with said validated learning effort proposals, said designing comprising drafting a course topic outline, a development plan, and a work plan that are associated with one another, wherein said development plan describes subject matter of the course content, materials needed to fulfill said validated learning effort proposals, course objectives, an outline of activities to be performed, and milestones to be met, and wherein said work plan defines production timelines, including completion deadlines for specific activities, and assigns specific tasks to individuals or groups for the development of said content and materials described by said development plan;

developing course content and materials covering topics identified in said course topic outline, wherein developing course content and materials comprises:

searching for pre-existing course content in a database; and selectively reusing the pre-existing course content;

certifying that said course content and materials are consistent with said priorities of said business goals; and storing said course content in a database, wherein said storing comprises:

dividing the course content into distinct course chapters;
tagging and cataloging the course content; and
storing the course content in the database, wherein said drafting of said course topic outline comprises performing:

an audience analysis comprising a determination whether a chosen instruction design is incompatible either with logistics of the learning audience or with learning services resources, wherein the audience analysis enables course requirements to be defined;

subsequent to defining and confirming course requirements, a curriculum impact analysis comprising a review to determine how a new learning effort impacts overall curriculum being offered by the learning effort proposal, including determining whether a completely new course is to be produced or whether an existing course can be modified or replaced, and after which selecting a delivery method based on said analyses, and organizing topics identified in a validated learning effort proposal based on said selected delivery method to produce said course topic outline.

2. The computer-implemented method according to claim 1, wherein said drafting of said development plan comprises:
preparing a deployment plan for content and materials based on said course topic outline;
preparing a cost and resource plan for said content and materials; and utilizing subject matter experts to describe the subject matter of the course content and materials.

3. The computer-implemented method according to claim 1, wherein said drafting of said work plan comprises:
designing a test approach for one of said validated learning effort proposals;
designing a certification testing plan; and
assigning project tasks to developers to develop particular items of content and materials from said development plan.

4. The computer-implemented method according to claim 3, wherein said work plan is a Gantt chart.

5. The computer-implemented method according to claim 1, wherein said course content and materials comprise sharable content objects, each object containing learning materials directed to a single topic area of instruction relevant to at least one of said validated learning effort proposals developed for said organization.

6. The computer-implemented method according to claim 1,
wherein certifying said course content and materials comprises:
creating instruction efficiency assessments following delivery of said course content and materials to a focus group of said employees, and
comparing the efficiency assessments to predefined levels of acceptable performance.

7. The computer-implemented method according to claim 1, wherein said method is outsourced from said organization according to a learning services agreement, said agreement specifying minimum service levels and performance metrics for determining whether said course content and materials and resulting learning efforts are meeting said service levels.

8. The computer-implemented method according to claim 7, comprising defining performance metrics reflected in said learning services agreement based on said business goals of said organization.

9. The computer-implemented method according to claim 7, wherein said performance metrics comprise a development ratio that monitors production of course content and materials defined by expended costs and by man-hours and elapsed time.

10. The computer-implemented method according to claim 7, wherein said learning services agreement establishes a cost schedule that provides a pre-set standard set of charges for tasks performed during said developing of said course content and materials, and wherein said cost schedule and manage quality of processing used in developing said course content and materials are revised based on said performance metrics.

11. The computer-implemented method according to claim 1, wherein said course content and materials are adapted for asynchronous delivery to said employees.

12. The computer-implemented method according to claim 1, wherein said developing of said course content and materials comprises one of purchasing or creating said content and materials.

13. A computer-readable storage medium that stores a set of instructions comprising a module, which, when executed, performs a method for developing content and materials to train members of an organization, said module operating within a learning solution adapted to provide training to the members of the organization, said learning solution comprising modules including a business strategy alignment module including:
processes for receiving and prioritizing learning needs of said organization and implementing learning efforts to address said needs, said module for developing comprising: an interface to accept preliminary learning effort proposals, said preliminary learning effort proposals based on requests for learning from said organization;
processes for receiving validated learning effort proposals from said organization, the feasibility of said preliminary learning effort proposals having been assessed by said organization;
processes for designing courses based on said validated learning effort proposals, said designing comprising drafting a course topic outline, a development plan, and a work plan; wherein said development plan describes subject matter of the course content, materials needed to fulfill said validated learning effort proposals, course objectives, an outline of activities to be performed, and milestones to be met; and wherein said work plan defines production timelines, including completion deadlines for specific activities, and assigns specific tasks to individuals or groups for the development of said content and materials described by said development plan;
processes for developing course content and materials covering topics identified in said course topic outline according to said development plan and said work plan, wherein developing course content comprises:
searching for pre-existing course content in a database; and
selectively reusing the pre-existing course content;
processes for certifying that said course content and materials are consistent with said prioritized learning needs of said organization; and
processes for storing said course content in a database, wherein said storing comprises:
dividing the course content into distinct course chapters;
tagging and cataloging the course content; and
storing the course content in the database,
wherein said drafting of said course topic outline comprises performing:
an audience analysis comprising a determination whether a chosen instruction design is incompatible either with logistics of the learning audience or with learning services resources, wherein the audience analysis enables course requirements to be defined;
subsequent to defining and confirming course requirements, a curriculum impact analysis comprising a review to determine how a new learning effort impacts overall curriculum being offered by the learning effort proposal, including determining whether a completely new course is to be produced or whether an existing course can be modified or replaced, and after which
selecting a delivery method based on said analyses, and
organizing topics identified in a validated learning effort proposal based on said selected delivery method to produce said course topic outline.

14. The computer-readable storage medium according to claim 13, wherein said development plan describes subject matter of the course content and materials needed to fulfill said validated learning effort proposals.

15. The computer-readable storage medium according to claim 13, wherein said drafting of said development plan comprises:
creating a deployment plan for content and materials to be prepared based on said course topic outline;
preparing a cost and resource plan for said content and materials; and
utilizing subject matter experts to describe the subject matter of the course content and materials.

16. The computer-readable storage medium according to claim 13, wherein said work plan defines production timelines and assigns specific tasks for the development of said content and materials described by said development plan.

17. The computer-readable storage medium according to claim 13, wherein said drafting of said work plan comprises:
designing a test approach for one of said validated learning effort proposals;
designing a certification testing plan; and
assigning project tasks to developers to develop particular items of content and materials to be prepared according to said development plan.

18. The computer-readable storage medium according to claim 17, wherein said work plan is a Gantt chart.

19. The computer-readable storage medium according to claim 13, wherein certifying said course content and materials comprises
creating instruction efficiency assessments following delivery of said course content and materials to a focus group of said employees, and
comparing the efficiency assessments to predefined levels of acceptable performance.

20. The computer-readable storage medium according to claim 13, wherein said module is outsourced from said organization according to a learning services agreement, said agreement specifying minimum service levels and performance metrics for determining whether said course content and materials and resulting learning efforts are meeting said service levels.

21. The computer-readable storage medium according to claim 20, wherein the performance metrics in said learning services agreement are defined by said goals.

22. The computer-readable storage medium according to claim 20, wherein said performance metrics comprise a development ratio that monitors production of course content and materials defined by expended costs and by man-hours and elapsed time.

23. The computer-readable storage medium according to claim 20, wherein said learning services agreement establishes a cost schedule that provides a pre-set standard set of charges for tasks performed during said developing of said course content and materials, and wherein said cost schedule and manage quality of processing used in developing said course content and materials are revised based on said performance metrics.

* * * * *